United States Patent [19]

Hasegawa

[11] Patent Number: 4,870,262

[45] Date of Patent: Sep. 26, 1989

[54] SIGNAL PROCESSING APPARATUS AND BINARY ENCODER CIRCUIT FOR THE SAME

[75] Inventor: Kazuo Hasegawa, Furukawa, Japan

[73] Assignee: Alps Electric Co., Ltd., Tokyo, Japan

[21] Appl. No.: 118,849

[22] Filed: Nov. 9, 1987

[30] Foreign Application Priority Data

Jan. 6, 1987 [JP] Japan .................................. 62-491
Feb. 18, 1987 [JP] Japan .............................. 62-35363
Mar. 17, 1987 [JP] Japan .............................. 62-38666
May 15, 1987 [JP] Japan ............................ 62-118184
May 15, 1987 [JP] Japan ............................ 62-118185

[51] Int. Cl.$^4$ .......................................... G06K 7/10
[52] U.S. Cl. .................................. 235/462; 235/436; 235/472; 250/555; 307/358; 307/359
[58] Field of Search ............... 235/436, 462, 463, 472; 307/358, 359, 351; 250/555

[56] References Cited

U.S. PATENT DOCUMENTS

| | | | |
|---|---|---|---|
| 3,777,268 | 12/1973 | Cleobury et al. | 307/351 X |
| 3,940,704 | 2/1976 | Bockett-Pugh | 307/351 X |
| 3,949,233 | 4/1976 | Gluck | 235/462 X |
| 4,305,008 | 12/1981 | Sutton | 307/359 X |
| 4,363,977 | 12/1982 | Tsuda et al. | 307/358 |
| 4,517,455 | 5/1985 | Benitez et al. | 235/472 X |
| 4,554,583 | 11/1985 | Saitoh et al. | |

Primary Examiner—David L. Trafton
Attorney, Agent, or Firm—Guy W. Shoup; Paul J. Winters; Brian D. Ogonowsky

[57] ABSTRACT

Disclosed is a signal processing apparatus comprising a sensor whose impedance varies according to changes in quantity sensed thereby, a power source applying a voltage to the sensor, a current/voltage conversion circuit for converting an output of current flowing through the sensor to a voltage signal, and a feedback means for passing a current corresponding to the output voltage of the current/voltage conversion circuit through the sensor. In a practical example thereof, a photosensor as the sensor is supplied with the voltage, the output current of the photosensor is supplied to the input terminal of the current/voltage conversion circuit, the output voltage of the current/voltage conversion circuit is compared with a reference voltage in a comparison circuit, the output thereof is supplied through a rectifier circuit to a voltage holding circuit to be held thereby and also supplied to a buffer circuit, the output voltage of the buffer circuit is supplied through a resistor to the input terminal of the current/voltage conversion circuit, and a processed signal is output from the output terminal of the current/voltage conversion circuit.

25 Claims, 10 Drawing Sheets

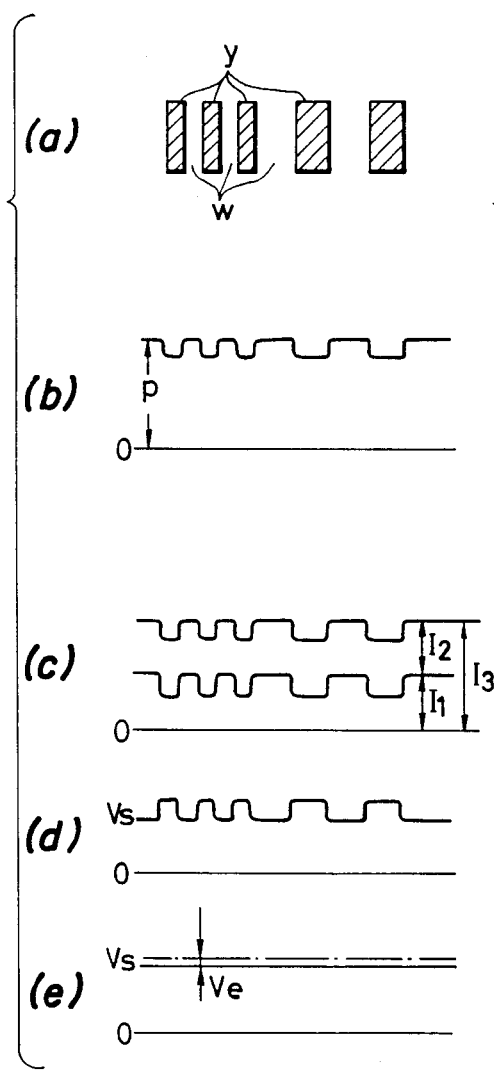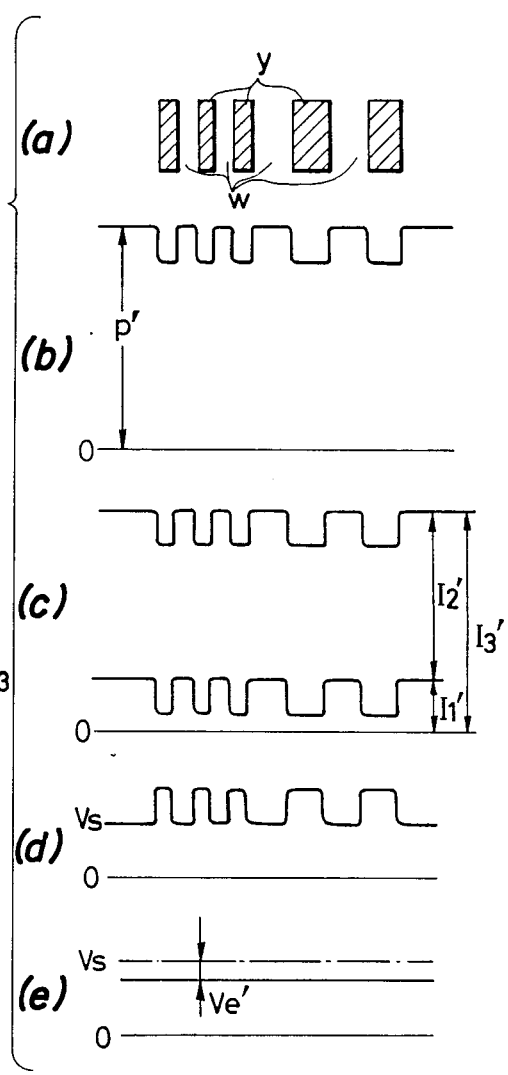

SIGNAL PROCESSING APPARATUS AND BINARY ENCODER CIRCUIT FOR THE SAME

BACKGROUND OF THE IVENTION

1. Field of the Invention

The present invention relates to a signal processing apparatus for processing a signal which is obtained from a photosensor whose impedance varies with changes in quantity of light received thereby.

It also relates to a binary encoder circuit for converting an input signal including a A.C. component output from the signal processing apparatus as mentioned above into a binary signal corresponding to variations in the A.C. component.

2. Description of the Prior Art

Nowadays photosensors are widely used for converting changes in quantity of received light into electrical signals corresponding to changes in brightness in image reading apparatus and optical coordinate inputting apparatus such as bar code readers, optical rotary encoders, facsimile devices, and image scanners.

Such a photosensor connected in series with a resistor is interposed between a power source and ground, and variations in the impedance of the photosensor in accordance with changes in quantity of received light is converted into an electrical signal and output as variations in the voltage divided by the photosensor and resistor.

The impedance of a photosensor does not become infinity even when no light is incident thereon and a dark current then flows therethrough. The quantity of light impinging on a photosensor consists of the reflected light from a printed object of inspection such as a bar code and the ambient disturbance light. Therefore, the current flowing through the photosensor includes an A.C. component as the signal for the changes in the reflected light and a D.C. component superposed thereon due to the dark current or ambient disturbance light. The D.C. component widely varies with the ambient brightness, quantity of light emitted from a light source impinging on the surface of a bar code or the like, reflectivity of the bar code surface, magnitude of the dark current characteristic of the photosensor, and so on.

Therefore, to extract the A.C. component as the signal while blocking up such a D.C. component, a signal processing system of an A.C. coupling type, for example, has so far been practiced. FIG. 19 is a circuit diagram of a conventional signal processing apparatus of such an A.C. coupling type. In FIG. 19, the light emitted from an LED 1 to impinge on a bar code surface is reflected by the bar code surface and received by a phototransistor 2 as a photosensor. The phototransistor 2 and a resistor 3 connected in series are interposed between a power supply terminal and ground and a junction of the phototransistor 2 and the resistor 3 is connected through a direct current blocking capacitor 4 with an amplifier 5 or the like in the stage succeeding thereto.

With such arrangement, the D.C. component widely varying with ambient brightness and other is blocked up by the capacitor 4 and only the A.C. component as the signal is supplied to the amplifier 5 or the like.

Generally a bar code reading apparatus is adapted such that the bar code reading is performed by having a bar code surface on which predetermined character information has been recorded scanned with light and changes in quantity of the reflected light obtained by such a scanning on the bar code surface are converted into an electrical signal by means of a photosensor.

The electrical signal output from the photosensor as the result of the scanning on the bar code surface is composed of a low-intensity signal portion, or an A.C. component with small amplitudes changing in one direction, and a D.C. component superposed thereon with considerable intensity due to ambient disturbance light and dark current in the photosensor. Therefore, in order to read the bar code, there is provided a binary encoder circuit for converting the small changes in the A.C. component into a binary signal.

An example of a conventional binary encoder circuit is shown in FIG. 21. In the circuit of FIG. 21, a signal input terminal 1 supplied with an input signal is connected with a power supply V through a resistor 2 and with the negative input of a comparator 3, and further connected with the anode of a first diode 4 and the cathode of a second diode 5. The cathode of the first diode 4 and the anode of the second diode 5 connected with each other are grounded through a capacitor 6 and also connected with the positive terminal of the comparator 3 through a resistor 7. The output terminal of the comparator 3 is connected with a signal output terminal through a resistor 9. In the above, the resistors 7 and 9 are for applying a positive feedback to the comparator 3 for providing a hysteresis voltage therefor.

With such arrangement, if an input signal as indicated by the solid line in FIG. 22(a) is supplied to the signal input terminal 1, the forward voltage drop $V_F$ in the first diode 4 is reduced from the variation when the A.C. component is on the rise, and the forward voltage drop $V_F$ in the second diode 5 is reduced from the variation when the A.C. component is on the fall, and further, the signal is smoothed to a certain degree by the capacitor 6, and consequently, the signal as indicated by the one-dot chain line in FIG. 22 (a) is supplied to the positive input of the comparator 3. Thus, a binary encoded signal as shown in FIG. 22 (b) in which "H" and "L" output levels are switched to each other each time the relative magnitude of the signals supplied to the positive and negative inputs is reversed is output from the output terminal of the comparator 3 to the signal output terminal 8.

Now, in the above described signal processing apparatus of an A.C. coupling type, until a D.C. potential difference across the capacitor 4 developed by the D.C. component is discharged, the mean value of the A.C. component appearing at the stage succeeding to the capacitor 4 varies as indicated by the dotted line in FIG. 20(b). Therefore, when such an A.C. component has been binary encoded with a value taken as reference, there has been a problem such as that a binary signal having different widths from the A.C. component given to the capacitor 4 as shown in FIG. 20(a) has been produced.

Besides, since the signal processing apparatus of the A.C. coupling type have required a large dynamic range corresponding to a large change in the D.C. component, and since such a large dynamic range has not been obtained in apparatus using a power source at a low voltage such as a battery, there has been dissatisfaction with such apparatus.

Accordingly, the present invention was directed to solve the above mentioned problem in the conventional signal processing apparatus, and it has as its first technical problem the provision of a signal processing apparatus for outputting a signal corresponding to changes in the impedance of a photosensor superposed on a predetermined reference voltage.

Also, the present invention was directed to solve the above mentioned problem in the conventional signal processing apparatus, and it has as its second technical problem the provision of a signal processing apparatus whereby only the A.C. component corresponding to changes in the impedance of a photosensor is amplified and output as a signal.

Further, in the above described conventional binary encoder circuit, since the threshold levels are established by the forward voltage drop $V_F$ in the first and second diodes 4 and 5, in the case where the magnitude of variation in the A.C. component is smaller than the forward voltage drop $V_F$, there occurs no reversal of relative magnitude of the signals supplied to the positive and negative inputs of the comparative 3, so that the comparator 3 is unable to detect a signal. Even if it be able to, the pulse widths of the obtained binary signal hardly agree with the pulse widths of the input signal and a large error is produced. Furthermore, since the forward voltage drop $V_F$ in the first and second diodes 4 and 5 is relatively high as approximately 0.6 V, the magnitude of variation of the A.C. component must be at least 1.2 V in order that the input signal is correctly binary encoded. In a bar code reader, the amplitude of the electrical signal from the photosensor varies as much as 3 to 10 times according to conditions such as reflectivity of the paper surface or the angle of incidence of the reflected light. Therefore, in order that the input signal is binary encoded correctly, 3.6 to 12 V or so of the dynamic range of the input signal is required. Hence, a voltage as high as 5 to 15 V or so is required of the power supply voltage of the bar code reader. Specifically, in the case of a portable type obtaining the power voltage from a dry battery incorporated therein, the number of the dry cells to be connected in series becomes large to obtain such a high power voltage, and this becomes a big problem in practical use of such a type.

Besides, since the foward voltage drop $V_F$ in the first and second diodes 4 and 5 varies with temperature, there is such a problem that the magnitude of variation in the A.C. component of the input signal which can be converted to a binary signal is inconstant, or the pulse widths of the converted binary signal are variable.

Accordingly, the present invention was made in view of the above described conditions of the conventional binary encoder circuit, and it has as its third technical problem the provision of a binary encoder circuit capable of correct binary encoding of an input signal whose magnitude of variation is small.

SUMMARY OF THE INVENTION

To solve the above mentioned technical problems, technical means of the present invention are arranged as follows:

The signal processing apparatus as first technical means of the present invention is arranged such that a photosensor whose impedance varies according to changes in quantity of light received thereby is supplied with a voltage, the output current of the photosensor is supplied to the input terminal of a current/voltage conversion circuit, the output voltage of the current/voltage conversion circuit is compared with a reference voltage in a comparison circuit, the output thereof is supplied through a rectifier circuit to a voltage holding circuit to be held thereby and also supplied to a buffer circuit, the output voltage of the buffer circuit is supplied through a resistor to the input terminal of the current/voltage conversion circuit, and a processed signal is output from the output terminal of the current/voltage conversion circuit.

It is also arranged such that a photosensor whose impedance varies according to changes in quantity of light received thereby is supplied with a voltage, the output current of the photosensor is supplied to the input terminal of a current/voltage conversion circuit, the output voltage appearing at the output terminal of the current/voltage conversion circuit is supplied to a voltage holding circuit through a voltage variation detection circuit operative in response to a voltage variation in one direction, the voltage held in the voltage holding circuit is compared with a reference voltage in a differential amplifier circuit, the output voltage thereof is supplied through a resistor to the input terminal of the current/voltage conversion circuit, and a processed signal is output from the output terminal thereof.

The signal processing apparatus as second technical means of the present invention is arranged such that a photosensor whose impedance varies according to changes in quantity of light received thereby is supplied with a voltage, the output current of the photosensor is supplied to the input terminal of a current/voltage conversion circuit, the output voltage appearing at the output terminal of the current/voltage conversion circuit is supplied to a voltage holding circuit through a voltage variation detection circuit operative in response to a voltage variation in one direction, the voltage held in the voltage holding circuit is compared with a reference voltage in a first differential amplifier circuit, the output voltage thereof is supplied through a resistor to the input terminal of the current/voltage conversion circuit, and the difference voltage between the output voltage appearing at the output terminal of the current/voltage conversion circuit and the reference voltage is amplified in a second differential amplifier circuit, whereby a processed signal is output from an output terminal.

It is also arranged such that a photosensor whose impedance varies according to changes in quantity of light received thereby is supplied with a voltage, the output current of the photosensor is supplied to the input terminal of a current/voltage conversion circuit, the output voltage of the current/voltage conversion circuit is compared with a reference voltage in a comparison circuit, the output thereof is supplied through a rectifier circuit to a voltage holding circuit to be held thereby and also supplied to a buffer circuit, the output voltage of the buffer circuit is supplied through a resistor to the input terminal of the current/voltage conversion circuit, and the difference voltage between the output voltage appearing at the output terminal of the current/voltage conversion circuit and the reference voltage is amplified in a differential amplifier circuit, whereby a processed signal is output from an output terminal.

The binary encoder circuit as third technical means of the present invention is arranged such that an input signal is supplied through a direct current blocking capacitor to one input of a comparator, a reference voltage is supplied to the other input of the comparator, an upper limit voltage and a lower limit voltage which are a predetermined potential difference higher and lower than the reference voltage are set up, the upper limit voltage is supplied through a first ideal diode disposed in the reverse direction to the above mentioned one input of the comparator, and the lower limit voltage is supplied through a second ideal diode disposed in the forward direction to the same, whereby a binary signal is output from the output terminal of the comparator.

The above described technical means function as follows:

The first technical means functions, since the output voltage of the current/voltage conversion circuit to which the output current of the photosensor is supplied is compared with the reference voltage in the comparison circuit, the output voltage of the buffer circuit is controlled by the output voltage of the comparison circuit, and the output voltage of the buffer circuit is supplied through a resistor to the input terminal of the current/voltage conversion circuit to which the photosensor is connected, such that, when the output voltage of the current/voltage conversion circuit is different from the reference voltage, the magnitude of the input current to the current/voltage conversion circuit is varied according to the output voltage of the buffer circuit, whereby the output voltage is brought equal to the reference voltage. Further, since the output of the comparison circuit is supplied through the rectifier circuit to the buffer circuit and also the output is held in the voltage holding circuit, it functions such that, when the output voltage at the output terminal of the current/voltage conversion circuit varies responding to variations in the impedance of the photosensor due to changes in quantity of light received thereby, the output held in the voltage holding circuit is continued to be supplied to the buffer circuit if the output of the comparison circuit is the reverse voltage to the rectifier circuit, whereby the output voltage of the current/voltage conversion circuit is varied responding to variations in the impedance of the photosensor and a desired signal is obtained.

Also, with the input terminal of the current/voltage conversion circuit to which the output current of the photosensor is supplied connected through a resistor to the output terminal of the differential amplifier circuit, the means functions such that the output voltage of the differential amplifier circuit is controlled by the difference voltage between the voltage held by the voltage holding circuit responding to the output voltage of the current/voltage conversion circuit and the reference voltage, whereby the output voltage of the current/voltage conversion circuit is brought equal to the reference voltage. And, since the voltage held by the voltage holding circuit is adapted to be varied responding to the voltage variation only on the rise or on the fall of the output voltage of the current/voltage conversion circuit by means of the voltage variation detection circuit, the output voltage of the current/voltage conversion circuit is arranged to be varied with respect to the reference voltage by either increase or decrease in the impedance of the photosensor and thereby a desired signal is output.

The second technical means functions, with the input terminal of the current/voltage conversion circuit to which the output current of the photosensor is supplied connected through a resistor to the output terminal of the first differential amplifier circuit, such that the output voltage of the first differential amplifier circuit is controlled by the difference voltage between the voltage held by the voltage holding circuit responding to the output voltage of the current/voltage conversion circuit and the reference voltage, whereby the output voltage of the current/voltage conversion circuit is brought equal to the reference voltage. And, with the voltage held by the voltage holding circuit adapted to vary responding to the voltage variation only on the rise or on the fall of the output voltage of the current/voltage conversion circuit by means of the voltage variation detection circuit, it is arranged such that the output voltage of the current/voltage conversion circuit is varied with respect to the reference voltage by either increase or decrease in the impedance of the photosensor. Further, it is arranged such that the difference voltage between the output voltage of the current/voltage conversion circuit and the reference voltage is amplified in the second differential amplifier circuit and the output therefrom, whereby only the A.C. component corresponding to the changes in the impedance of the photosensor is amplified and output as a signal.

Also, the means functions, since the output voltage of the current/voltage conversion circuit to which the output current of the photosensor is supplied is compared with the reference voltage in the comparison circuit, the output voltage of the buffer circuit is controlled by the output voltage of the comparison circuit, and the output voltage of the buffer circuit is supplied through a resistor to the input terminal of the current/voltage conversion circuit to which the photosensor is connected, such that, when the output voltage of the current/voltage conversion circuit is different from the reference voltage, the magnitude of the input current to the current/voltage conversion circuit is varied according to the output voltage of the buffer circuit whereby the output voltage is brought equal to the reference voltage. Further, since the output of the comparison circuit is supplied through the rectifier circuit to the buffer circuit and also the output is held in the voltage holding circuit, it functions such that, when the output voltage at the output terminal of the current/voltage conversion circuit varies responding to variations in the impedance of the photosensor due to changes in quantity of light received thereby, the output held in the voltage holding circuit is continued to be supplied to the buffer circuit if the output of the comparison circuit is the reverse voltage to the rectifier circuit, whereby the output voltage of the current/voltage conversion circuit is varied responding to variations in the impedance of the photosensor. And, since the difference voltage between the output of the current/voltage conversion circuit and the reference voltage is amplified in the differential amplifier circuit and output therefrom, only the A.C. component corresponding to the changes in the impedance of the photosensor is output as a signal.

The third technical means functions, since the input signal supplied to one input of the comparator is adapted to be clamped at an upper limit voltage and a lower limit voltage which are a predetermined potential difference higher and lower than the reference voltage supplied to the other input, so as to detect the input signal when its magnitude of variation is larger than the predetermined potential difference and convert the same into a binary signal. Since the predetermined potential difference can be set to a small value as required by voltage division by means of resistors or the like, small changes in the input signal can be correctly converted to a binary signal.

BRIEF DESCRIPTION OF THE DRAWINGS

FIGS. 2a–e and 3a–e are waveform charts for explaining operations of the embodiment of FIG. 1.

DESCRIPTION OF THE PREFERRED EMBODIMENTS

Figure 1:
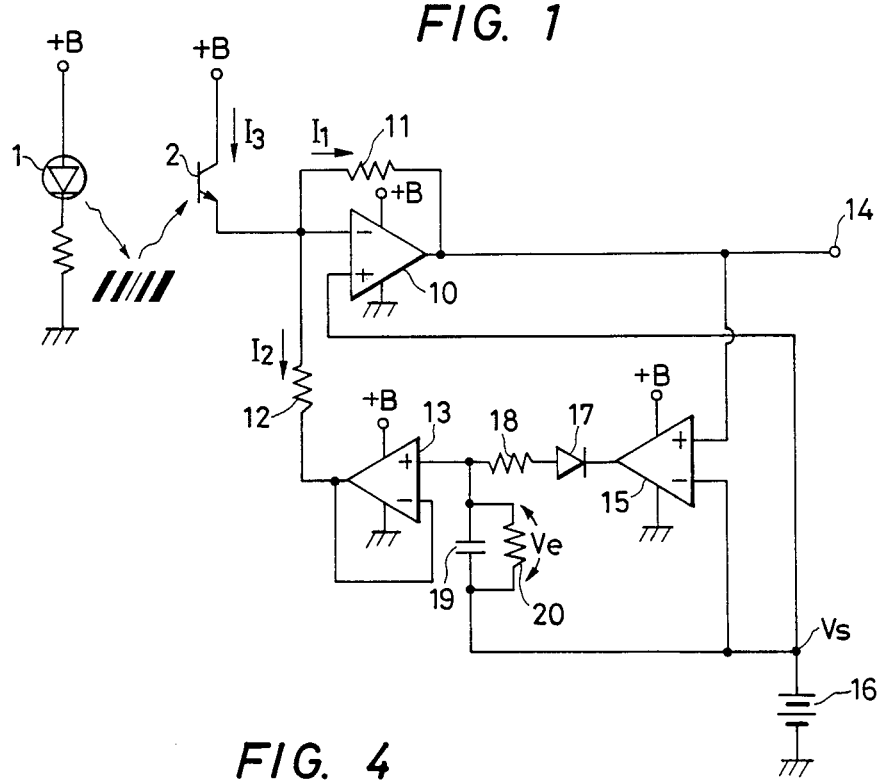
FIG. 1 is a circuit diagram for a first embodiment.

A first embodiment of the present invention will be described below with reference to FIGS. 1 to 4. FIG. 1 is a circuit diagram of an embodiment of a signal processing apparatus, FIG. 2 is a chart for explaining the operation when the quantity of light received by the phototransistor is small, and FIG. 3 is a chart for explaining the operation when the quantity of light received by the phototransistor is large.

The construction will first be described referring to FIG. 1. The light emitted from an LED 1 to irradiate a bar code surface is reflected by the bar code surface to be received by a phototransistor 2 as a photosensor. The collector of the phototransistor 2 is connected with the power supply terminal and the emitter is connected to the inverting input of a first operational amplifier 10 and to the output terminal of the first operational amplifier 10 through a resistor (of e.g 100 KΩ) 11, and further, to the output terminal of a second operational amplifier 13 through a resistor (of e.g. 1 KΩ). The output terminal of the first operational amplifier 10 is connected to the output terminal 14 and also connected to the noninverting input of a third operational amplifier 15. The inverting input of the third operational amplifier 15 and the noninverting input of the first operational amplifier 10 are connected with a reference voltage circuit 16 outputting a reference voltage $V_S$. The output terminal of the third operational amplifier 15 is connected with the cathode of a diode 17 and the anode of the diode 17 is connected with the noninverting input of the second operational amplifier 13 through a resistor 18. The noninverting input of the second operational amplifier 13 is connected with the reference voltage circuit 16 through a parallel connection of a capacitor 19 and a resistor 20 and the inverting input is connected with the output terminal.

With such arrangement, a current/voltage conversion circuit is formed of the first operational amplifier 10 the noninverting input thereof being supplied with the reference voltage $V_S$ and the resistor 11, a buffer circuit is formed of the second operational amplifier 13, a comparison circuit is formed of the third operational amplifier 15 to which the output voltage of the first operational amplifier 10 and the reference voltage $V_S$ are supplied, a rectifier circuit is formed of the diode 17, and a voltage holding circuit is formed of the parallel connection of the capacitor 19 and the resistor 20 one end thereof being supplied with the reference voltage $V_S$. The capacitor 19 is provided with a large discharging time constant by the resistor 20.

Now, with the power turned on, if the phototransistor 2 is not confronting the bar code surface, the phototransistor 2 receives the ambient disturbance light. Then, the reference voltage $V_S$ output from the reference voltage circuit 16 is supplied through a resistor 20 to the noninverting input of the second operational amplifier 13 and its output terminal obtains the reference voltage $V_S$. Thereupon, a current flows from the power supply terminal to the output terminal of the second operational amplifier 13, and thereby, the potential at the inverting input of the first operational amplifier 10 becomes higher than the reference voltage $V_S$ and as a result the first operational amplifier 10 tends to output an "L" level voltage. Then, a current $I_1$ flows from the inverting input to the output terminal through the resistor 11, and, according to the magnitude of this current, the potential at the output terminal is established. Since this output voltage is lower than the reference voltage $V_S$, the output of the third operational amplifier 15 becomes an "L" level voltage to render the diode 17 conductive, whereby the output of the third operational amplifier 15 is integrated by the resistor 18 and the capacitor 19, and thus, the capacitor 19 is charged through the diode 17 disposed in the forward direction. Thereupon, the noninverting input of the second operational amplifier 13 is supplied with a voltage equal to the reference voltage $V_S$ less the potential difference $V_e$ across the capacitor 19, and the voltage equal to the reference voltage $V_S$ less the potential difference $V_e$ is output therefrom to increase a current $I_2$ passing through the resistor 12. As a result, the potential at the inverting input of the first operational amplifier 10 is lowered and the current $I_1$ flowing through the resistor 11 is decreased, and thereby, the output voltage at the output terminal is raised and brought equal to the reference voltage $V_S$.

Now, the operation when the quantity of received light by the phototransistor 2 is small will be described with reference to FIG. 2.

The phototransistor 2 disposed to face the bar code surface scans the bar code with white portions w and black portions y alternately arranged thereon as shown in FIG. 2(a), starting from the white ground portion. When the phototransistor 2 faces the white ground portion, the reflected light becomes strong, i.e., the phototransistor 2 receives the quantity of light at the level p as shown in FIG. 2(b). Thereupon, the impedance of the phototransistor 2 is lowered to increase the current $I_3$ flowing therethrough, whereby the potential at the inverting input of the first operational amplifier 10 tends to rise to increase the current $I_1$ flowing through the resistor 11 and lower the output voltage at the output terminal. Thus, the output terminal of the third operational amplifier 15 is brought to an "L" level and the output therefrom is integrated by the capacitor 19 resulting in a rise in the potential difference $V_e$ across the capacitor 19, and thereby, a still lower output voltage appears at the output terminal of the second operational amplifier 13. As a result, the current $I_2$ flowing through the resistor 12 increases, so that, while the potential at the inverting input of the first operational amplifier 10 is maintained, the current $I_1$ flowing through the resistor 11 is also maintained constant, and thus, the output voltage at the output terminal is kept equal to the reference voltage $V_S$.

Then, if the phototransistor 2 is made to scan the bar code, the quantity of received light decreases at the black portion y as shown in FIG. 2(b) and the impedance of the phototransistor 2 increases. Then, the current $I_3$ flowing through the phototransistor 2 is decreased as shown in FIG. 2(c), whereby the potential at the inverting input of the first operational amplifier 10 tends to fall to decrease the current $I_1$ flowing through the resistor 11 and raise the output voltage at the output terminal higher than the reference voltage $V_S$. At this time, the third operational amplifier 15 outputs an "H" level voltage but the current flowing into the capacitor 19 is blocked up by the diode 17. Therefore, the potential difference $V_e$ across the capacitor 19 is kept unchanged as shown in FIG. 2(e) and the output voltage of the second operational amplifier 13 is kept unchanged, and consequently the current $I_2$ flowing through the resistor 12 is kept unchanged. Hence, the $I_1$ flowing through the resistor 11 is not maintained constant but decreased. So that, the output voltage at the output terminal of the first operational amplifier 10 becomes higher than the reference voltage $V_S$ as shown in FIG. 2(d).

Thus, at the black portion y of the bar code, an output as the signal at a higher voltage than the reference voltage $V_S$ appears at the output terminal 14.

Further, the operation when the quantity of received light by the phototransistor 2 is larger will be described with reference to FIG. 3.

When the phototransistor 2 facing the bar code surface receives from the white portion w a quantity of light at a higher level p' as shown in FIG. 3(b), the impedance of the phototransistor 2 is greatly lowered. As a result, the current $I_3'$ flowing through the phototransistor 2 becomes as large as shown in FIG. 3(c), whereby also the potential at the inverting input of the first operational amplifier 10 tends to rise to increase current $I_1'$ flowing through the resistor 11, so that the output voltage is greatly lowered. Then, the output terminal of the third operational amplifier 15 is brought to an "L" level, the potential difference $V_e'$ across the capacitor 19 is raised as shown in FIG. 3(e), the output voltage of the second operational amplifier 13 is lowered, and the current $I_2'$ flowing through the resistor 12 is increased. Thus, the potential difference $V_e'$ across the capacitor 19 is rasied, the output voltage of the second operational amplifier 13 is lowered, and the current $I_2'$ is increased as shown in FIG. 3(c) until the output voltage at the output terminal of the first operational amplifier 10 is brought equal to the reference voltage $V_S$. Then, if the phototransistor 2 is made to scan the bar code, the quantity of received light is decreased at the black portion y, the impedance of the phototransistor 2 is increased to decrease the current $I_3'$. Thereby, the potential at the inverting input of the first operational amplifier 10 tends to fall to decrease the current $I_1'$ flowing through the resistor 11 and raise the voltage at the output terminal. At this time, the potential difference $V_e'$ across the capacitor 19 is kept unchanged and the current $I_1'$ flowing through the resistor 11 is not maintained constant but decreased. As a result, an output is provided at the output terminal 14 as the signal having a higher voltage than the reference voltage $V_S$ at the black portion y of the bar code. And, the larger the quantity of light received by the phototransistor 2, the higher becomes the voltage of the signal at the black portion y.

Although the above described embodiment has been arranged such that the black portion y is detected as the signal with the impedance of the phototransistor 2 at the white portion w taken as reference, it is possible to detect the white portion w as the signal with the impedance of the phototransistor 2 at the black portion y taken as reference by disposing the diode 17 in the reverse direction.

Figure 4:
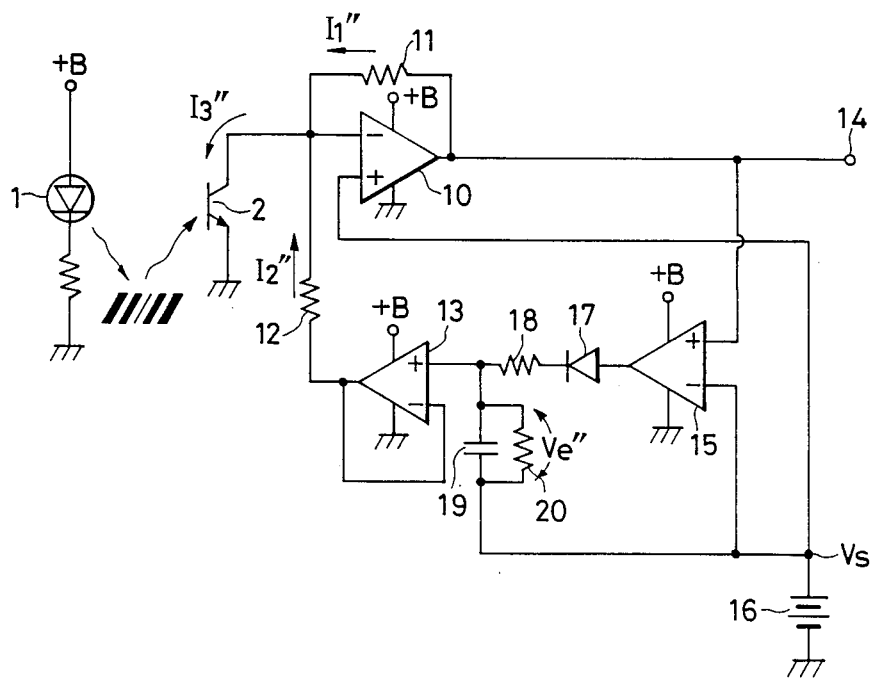
FIG. 4 is a circuit diagram for a variation of the embodiment of FIG. 1.

FIG. 4 is a circuit diagram showing a variation of the above described embodiment of the signal processing apparatus. The circuit elements in FIG. 4 like those in FIG. 1 are denoted by like reference numerals and duplicate description for the same will be omitted.

What are different in FIG. 4 from FIG. 1 are that the collector of the phototransistor 2 is connected to the inverting input of the first operational amplifier 10 and the emitter is grounded, and further, that the output terminal of the third operational amplifier 15 is connected to the anode of the diode 17 and the cathode of the diode 17 is connected through the resistor 18 to the noninverting input of the second operational amplifier 13.

With such arrangement having the power turned on, a current flows from the output terminal of the second operational amplifier 13 through the resistor 12 against a certain impedance value of the phototransistor 2 to lower the potential at the inverting input of the first operational amplifier 10 than the reference voltage $V_S$, and thereby, the first operational amplifier 10 tends to output an "H" level voltage at the output terminal and the output voltage is established by the current $I_1''$ flowing through the resistor 11. Then, the third operational amplifier 15 outputs an "H" level voltage and this output is integrated such that the capacitor 19 is charged through the diode 17, and thereby, a higher voltage than the reference voltage $V_S$ is output from the second operational amplifier 13. Then, the potential at the inverting input of the first operational amplifier 10 is lowered to decrease the current $I_1''$ flowing through the resistor 11, and thus, the output voltage at the output terminal of the first operational amplifier 10 is brought into agreement with the reference voltage $V_S$.

Then, if the phototransistor 2 is made to scan the bar code, the phototransistor 2 facing the white portion w receives strong reflected light to lower the impedance of the same and increase the current $I_3''$ flowing therethrough, and thereby, the potential at the inverting input of the first operational amplifier 10 tends to fall to increase the current $I_1''$ flowing through the resistor 11 and raise the output voltage at the output terminal. So that, the output terminal of the third operational amplifier 15 is brought to an "H" level and this output is integrated by the capacitor 19 to increase the potential difference $V_e''$ across the capacitor 19 and thus a still higher output voltage is output at the output terminal of the second operational amplifier 13. As the result, the current $I_2''$ flowing through the resistor 12 is increased, whereby the potential at the inverting input of the first operational amplifier 10 is maintained, the current $I_1''$ flowing through the resistor 11 is also maintained constant, and the output voltage at the output terminal is kept unchanged to remain equal to the reference voltage $V_S$.

And, at the black portion y, the impedance of the phototransistor 2 is increased to decrease the current $I_3''$, and thereby, the current $I_1''$ flowing through the resistor 11 is decreased and the output voltage at the output terminal is lowered. Although the third operational amplifier 15 outputs an "L" level voltage, the potential difference $V_e''$ across the capacitor 19 is kept unchanged by being blocked by the diode 17 and the output voltage of the second operational amplifier 13 is kept unchanged. As a result, an output as the signal having a lower voltage than the reference voltage $V_S$ at the black portion y of the bar code is output at the output terminal 14.

Also in the case of the above described embodiment of FIG. 4, it is possible to detect the white portion w as the signal with the black portion y taken as reference by reversing the direction of the diode 17.

As described above, the output voltage provided at the output terminal 14 is such a signal that the voltage is varied with respect to the reference voltage $V_S$ at the white portion w or black portion y, and therefore, it is enabled to positively detect only the signal by comparing the output voltage with the reference voltage $V_S$. If there are differences in the quantity of light received by the phototransistor 2, the white portion w or black portion y taken as reference provides the reference voltage $V_S$, and therefore, a large dynamic range is not required.

Figure 5:
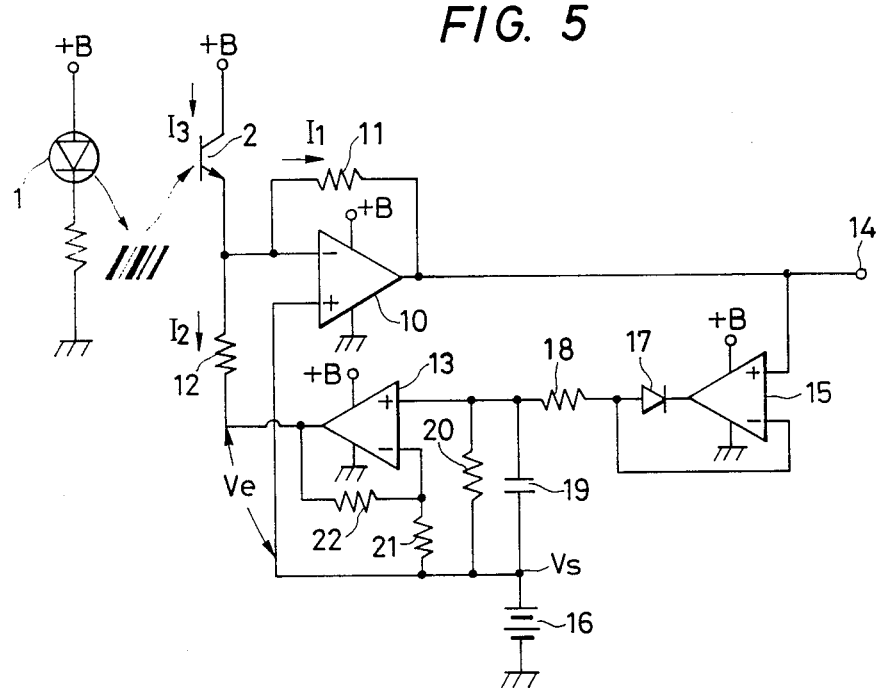
FIG. 5 is a circuit diagram for a second embodiment.
Figure 6:
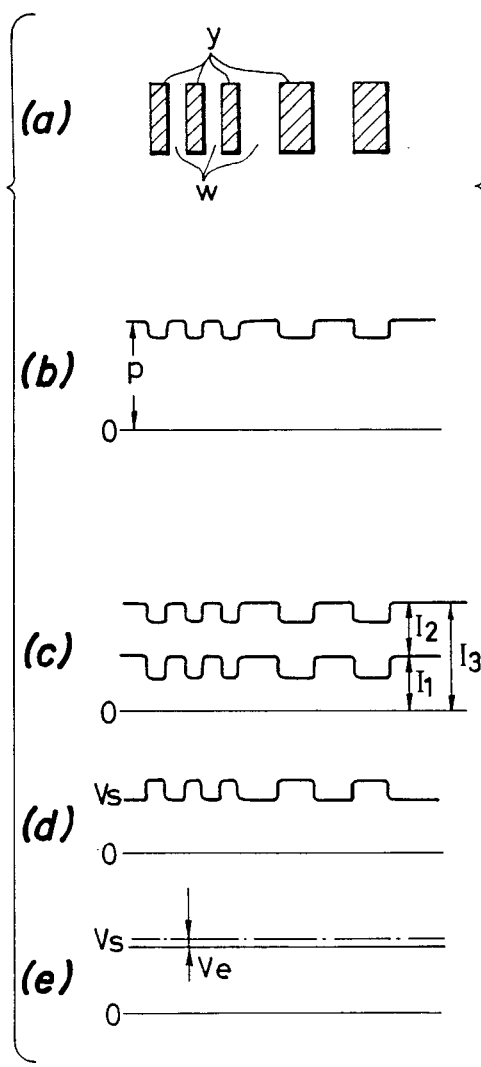
FIGS. 6a–e and 7a–e are waveform charts for explaining operations of the embodiment of FIG. 5.
Figure 7:
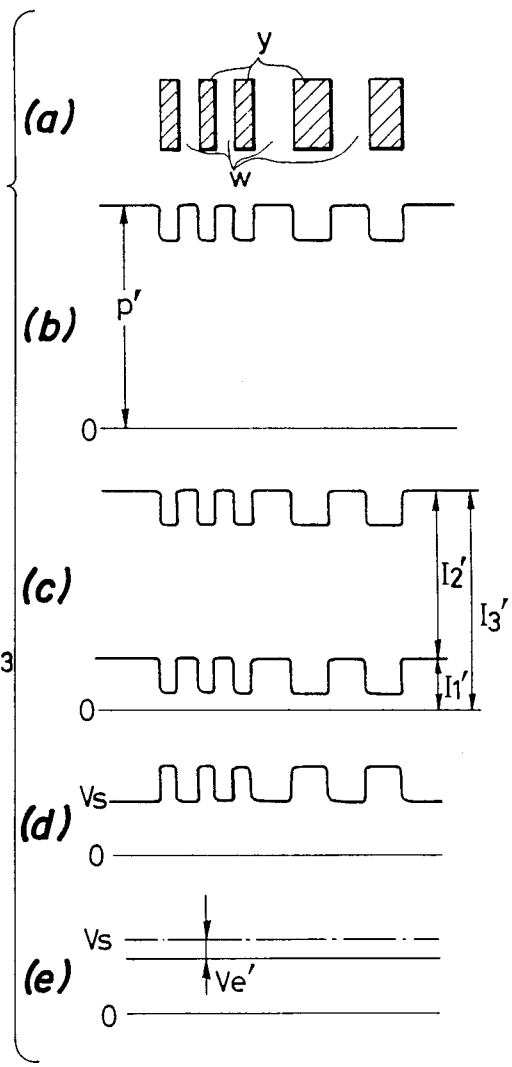

A second embodiment of the present invention will be described below with reference to FIGS. 5 to 8. FIG. 5 is a circuit diagram of an embodiment of the signal processing apparatus, FIG. 6 is a chart for explaining the operation of the apparatus of FIG. 5 when the quantity of light received by the phototransistor is small, and FIG. 7 is a chart for explaining the operation of the apparatus of FIG. 5 when the quantity of light received by the phototransistor is large.

The construction will first be described with reference to FIG. 5. The light emitted from an LED 1 to irradiate a bar code surface is reflected by the bar code surface to be received by a phototransistor 2 as a photosensor. The collector of the phototransistor 2 is connected with the power supply terminal and the emitter is connected to the inverting input of a first operational amplifier 10 and to the output terminal of the first operational amplifier 10 through a resistor (of e.g. 100 KΩ) 11, and further, to the output terminal of a third operational amplifier 13 through a resistor (of e.g. 1 KΩ). The output terminal of the first operational amplifier 10 is connected to an output terminal 14 and also connected to the noninverting input of a second operational amplifier 15. And, the noninverting input of the first operational amplifier 10 is connected with a reference voltage circuit 16 outputting a reference voltage $V_S$. The output terminal of the second operational amplifier 15 is connected with the cathode of a diode 17 and the anode of this diode 17 is connected with the noninverting input of the second operational amplifier 15. And, the anode of the diode 17 is connected with the noninverting input of the third operational amplifier 13 through a resistor 18. The noninverting input of the third operational amplifier 13 is connected with the reference voltage circuit 16 through a parallel connection of a capacitor 19 and a resistor 20 and the inverting input is connected with the reference voltage circuit 16 through a resistor 21 and with the output terminal thereof through a resistor 22.

With such arrangement, a current/voltage conversion circuit is formed of the first operational amplifier 10 the noninverting input thereof being supplied with the reference voltage $V_S$ and the resistor 11, a voltage variation detection circuit operative in response to a voltage variation in the direction to fall of the output voltage of the first operational amplifier 10 is formed of the second operational amplifier 15 and the diode 17, a voltage holding circuit is formed of the parallel connection of the capacitor 19 and the resistor 20 one end thereof being supplied with the reference voltage $V_S$, and a differential amplifier circuit is formed of the third operational amplifier 13. The capacitor 19 is provided with a large discharging time constant by the resistor 20.

Now, with the power turned on, if the phototransistor 2 is not confronting the bar code surface, the phototransistor 2 receives the ambient disturbance light. Then, the reference voltage $V_S$ output from the reference voltage circuit 16 is supplied through resistor 20, 21, 22 to the noninverting input, inverting input, and the output terminal of the third operational amplifier 13 and its output terminal obtains the reference voltage $V_S$. Thereupon, a current flows from the power supply terminal to the output terminal of the third operational amplifier 13, and thereby, the potential at the inverting input of the first operational amplifier 10 becomes higher than the reference voltage $V_S$ and as a result the first operational amplifier 10 tends to output an "L" level voltage. Then, a current $I_1$ flows from the inverting input to the output terminal through the resistor 11, and, according to the magnitude of this current, the potential at the output terminal is established. Since this output voltage is lower than the reference voltage $V_S$ and the anode of the diode 17 is supplied with the reference voltage $V_S$, the output of the second operational amplifier 15 becomes an "L" level voltage to render the diode 17 conductive, whereby the output of the second operational amplifier 15 is integrated by the resistor 18 and the capacitor 19, and thus, the capacitor 19 is charged through the diode 17 disposed in the foward direction. Thereupon, the noninverting input of the third operational amplifier 13 is supplied with a voltage equal to the reference voltage $V_S$ less the potential difference across the capacitor 19, and the voltage equal to the reference voltage $V_S$ less the potential difference $V_e$ is output at the output terminal to increase the current $I_2$ passing through the resistor 12. As a result, the potential at the inverting input of the first operational amplifier 10 is lowered and the current $I_1$ flowing through the resistor 11 is decreased, and thereby, the output voltage at the output terminal is raised and becomes equal to the reference voltage $V_S$.

Now, the operation when the quantity of light received by the phototransistor 2 is small will be described with reference to FIG. 6.

The phototransistor 2 disposed to face the bar code surface scans the bar code with white portions w and black portions y alternately arranged thereon as shown in FIG. 6(a), starting from the white ground portion. When the phototransistor 2 faces the white portion w, the reflected light becomes strong, i.e., the phototransistor 2 receives the quantity of light at the level p as shown in FIG. 6(b). Thereupon, the impedance of the phototransistor 2 is lowered to increase the current $I_3$ flowing therethrough, whereby the potential at the inverting input of the first operational amplifier 10 tends to rise to increase the current $I_1$ flowing through the resistor 11 and lower the output voltage at the output terminal. Thus, the output terminal of the second operational amplifier 15 is brought to an "L" level and the output therefrom is integrated by the capacitor 19 resulting in a rise in the potential difference across the capacitor 19, and thereby, a still lower output voltage is provided at the output terminal of the third operational amplifier 13. As a result, the current $I_2$ flowing through the resistor 12 increases, so that, while the potential at the inverting input of the first operational amplifier 10 is maintained, the current $I_1$ flowing through the resistor 11 is also maintained constant, and thus, the output voltage at the output terminal is kept equal to the reference voltage $V_S$.

Then, if the phototransistor 2 is made to scan the bar code, the quantity of received light decreases at the black portion y as shown in FIG. 6(b) and the impedance of the phototransistor 2 increases. Then, the current $I_3$ flowing through the phototransistor 2 is decreased as shown in FIG. 6(c), whereby the potential at the inverting input of the first operational amplifier 10 tends to fall to decrease the current $I_1$ flowing through the resistor 11 and raise the output voltage at the output terminal higher than the reference voltage $V_S$. At this time, the second operational amplifier 15 outputs an "H" level voltage but the current flowing into the capacitor 19 is blocked up by the diode 17. Therefore, the voltage held as the potential difference across the capacitor 19 remains unchanged and the potential difference $V_e$ between the output voltage of the third operational amplifier 13 and the reference voltage $V_S$ is kept unchanged as shown in FIG. 6(e), and consequently the current $I_2$ flowing through the resistor 12 is kept unchanged. Hence, the current $I_1$ flowing through the resistor 11 is not maintained constant but decreased. So that, the output voltage at the output terminal of the first operational amplifier 10 becomes higher than the reference voltage $V_S$ as shown in FIG. 6(d). The quantity of received light increases at the next white portion w when the bar code is further scanned whereby the impedance of the phototransistor 2 is decreased. Thereupon, the current $I_3$ flowing through the phototransistor 2 increases to increase the current $I_1$ flowing through the resistor 11, and thereby, the output voltage at the output terminal is lowered to the reference voltage $V_S$.

Thus, at the black portion y of the bar code, an output as the signal at a higher voltage than the reference voltage $V_S$ appears at the output terminal 14.

Further, the operation when the quantity of light received by the phototransistor 2 is larger will be described with reference to FIG. 7.

When the phototransistor 2 facing the bar code surface of FIG. 7(a) receives from the white portion w a quantity of light at a higher level p' as shown in FIG. 7(b), the impedance of the phototransistor 2 is greatly lowered. As a result, the current $I_3'$ flowing through the phototransistor 2 becomes as large as shown in FIG. 7(c), whereby also the potential at the inverting input of the first operational amplifier 10 tends to rise to increase the current $I_1'$ flowing through the resistor 11, so that the output voltage is greatly lowered. Then, the output terminal of the second operational amplifier 15 is brought to an "L" level, the potential difference across the capacitor 19 in increased, the potential difference $V_e'$ between the output voltage of the third operational amplifier 13 and the reference voltage $V_S$ is raised as shown in FIG. 7(e), the output voltage of the third operational amplifier 13 is lowered, and the current $I_2'$ flowing through the resistor 12 is increased. Thus, the potential difference $V_e'$ between the output voltage of the third operational amplifier 13 and the reference voltage $V_S$ is raised, the output voltage of the third operational amplifier 13 is lowered, and the current $I_2'$ is increased as shown in FIG. 7(c) until the output voltage at the output terminal of the first operational amplifier 10 is brought equal to the reference voltage $V_S$. Then, if the phototransistor 2 is made to scan the bar code, the quantity of received light is decreased at the black portion y, the impedance of the phototransistor 2 is increased to decrease the current $I_3'$. Thereby, the potential at the inverting input of the first operational amplifier 10 tends to fall to decrease the current $I_1'$ flowing through the resistor 11 and raise the voltage at the output terminal. At this time, the potential difference $V_e'$ between the output voltage of the third operational amplifier 13 and the reference voltage $V_S$ is kept unchanged by being blocked by the diode 17 and the current $I_1'$ flowing through the resistor 11 is not maintained constant but decreased. As a result, an output appears at the output terminal 14 as the signal having a higher voltage than the reference voltage $V_S$ at the black portion y of the bar code. And, the larger the quantity of light received by the phototransistor 2, the higher becomes the voltage of the signal at the black portion y.

Although the above described embodiment has been arranged such that the black portion y is detected as the signal with the impedance of the phototransistor 2 at the white portion w taken as reference, it is possible to detect the white portion w as the signal with the impedance of the phototransistor 2 at the black portion y taken as reference by disposing the diode 17 in the reverse direction.

Figure 8:
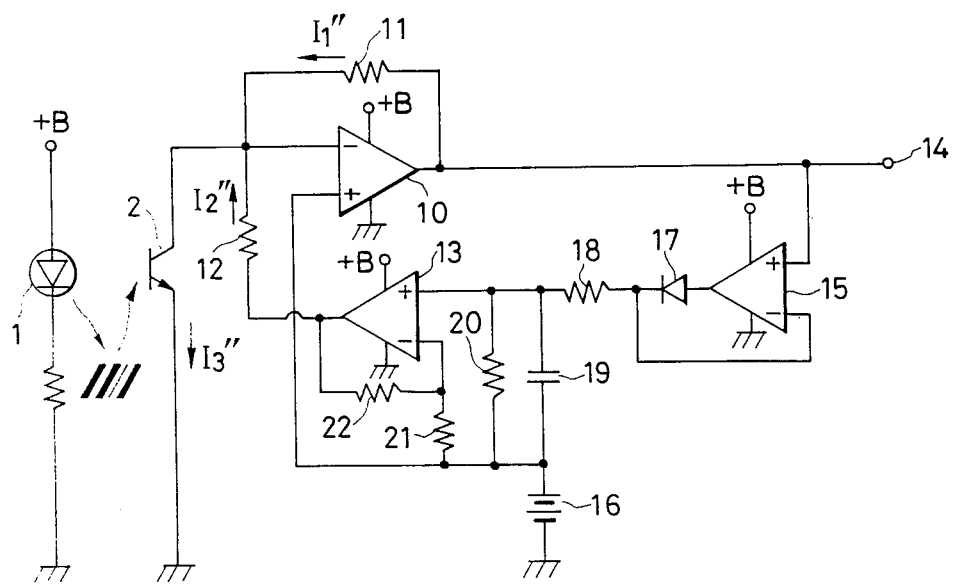
FIG. 8 is a circuit diagram for a variation of the embodiment of FIG. 5.

FIG. 8 is a circuit diagram showing a variation of the above described embodiment of the signal processing apparatus. The circuit elements in FIG. 8 like those in FIG. 5 are denoted by like reference numerals and duplicate description for the same will be omitted.

What are different in FIG. 8 from FIG. 5 are that the collector of the phototransistor 2 is connected to the inverting input of the first operational amplifier 10 and the emitter is grounded, and further, that the output terminal of the second operational amplifier 15 is connected to the anode of the diode 17 and the cathode of the diode 17 is connected through the resistor 18 to the noninverting input of the third operational amplifier 13.

With such arrangement having the power turned on, a current flows from the output terminal of the third operational amplifier 13 through the resistor 12 against a certain impedance value of the phototransistor 2 to lower the potential at the inverting input of the first operational amplifier 10 than the reference voltage $V_S$, and thereby, the first operational amplifier 10 tends to output an "H" level voltage at the output terminal and the output voltage is established by the current $I_1''$ flowing through the resistor 11. Then, the second operational amplifier 15 outputs an "H" level voltage and this output charges the capacitor 19 through the diode 17 disposed in the forward direction, and thereby, a higher voltage than the reference voltage $V_S$ is output from the second operational amplifier 13. Then, the potential at the inverting input of the first operational amplifier 10 is raised to decrease the current $I_1''$ flowing through the resistor 11, and thus, the output voltage at the output terminal of the first operational amplifier 10 is lowered so as to agree with the reference voltage $V_S$.

Then, if the phototransistor 2 is made to scan the bar code, the phototransistor 2 facing the white portion w receives strong reflected light to lower the impedance of the same and increase the current $I_3''$ flowing therethrough, and thereby, the potential at the inverting input of the first operational amplifier 10 tends to fall to increase the current $I_1''$ flowing through the resistor 11 and raise the output voltage at the output terminal. So that, the output terminal of the second operational amplifier 15 is brought to an "H" level and this output is integrated by the capacitor 19 to increase the potential difference across the capacitor 19 and thus a still higher output voltage appears at the output terminal of the third operational amplifier 13. As the result, the current $I_2''$ flowing through the resistor 12 is increased, whereby the potential at the inverting input of the first operational amplifier 10 is maintained, the current $I_1''$ flowing through the resistor 11 is also maintained constant, and the output voltage at the output terminal is kept unchanged to remain equal to the reference voltage $V_S$.

And, at the black portion y, the impedance of the phototransistor 2 is increased to decrease the current $I_3''$, and thereby the current $I_1''$ flowing through the resistor 11 is decreased and the output voltage at the output terminal is lowered. Although the second operational amplifier 15 outputs an "L" level voltage, the potential difference across the capacitor 19 is kept unchanged by being blocked by the diode 17 and the output voltage of the third operational amplifier 13 is kept unchanged. As a result, an output as the signal having a lower voltage than the reference voltage $V_S$ at the black portion y of the bar code is output at the output terminal 14.

Also in the case of the above described embodiment of FIG. 8, it is possible to detect the white portion w as the signal with the black portion y taken as reference by reversing the direction of the diode 17.

As described above, the output voltage provided at the output terminal 14 is such a signal that the voltage is varied with respect to the reference voltage $V_S$ at the white portion w or black portion y, and therefore, it is enabled to positively detect only the signal by comparing the output voltage with the reference voltage $V_S$. Even if there are differences in the quantity of light received by the phototransistor 2, the white portion w or black portion y taken as reference provides the reference voltage $V_S$, and therefore, a large dynamic range is not required.

Figure 9:
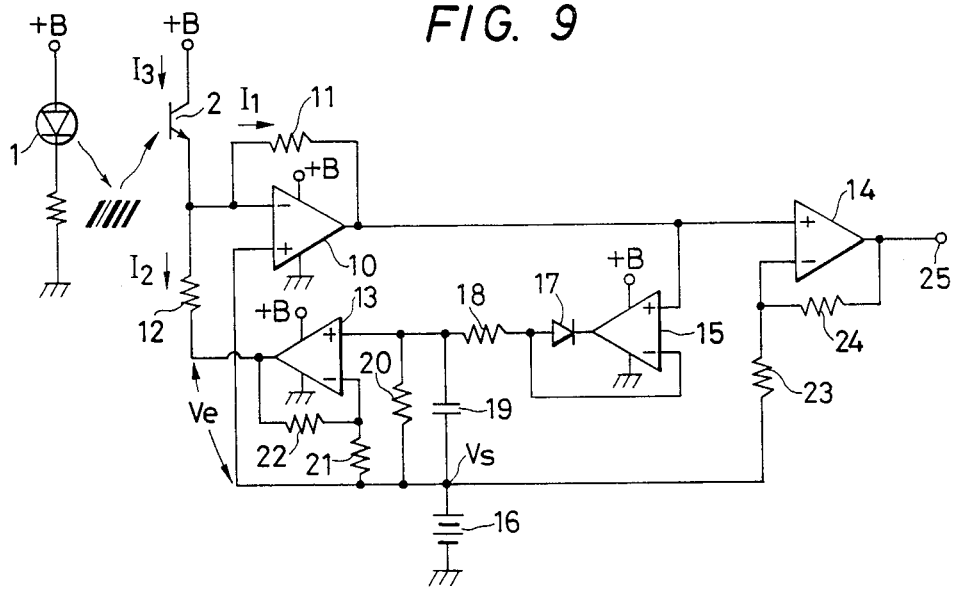
FIG. 9 is a circuit diagram for a third embodiment.
Figure 10:
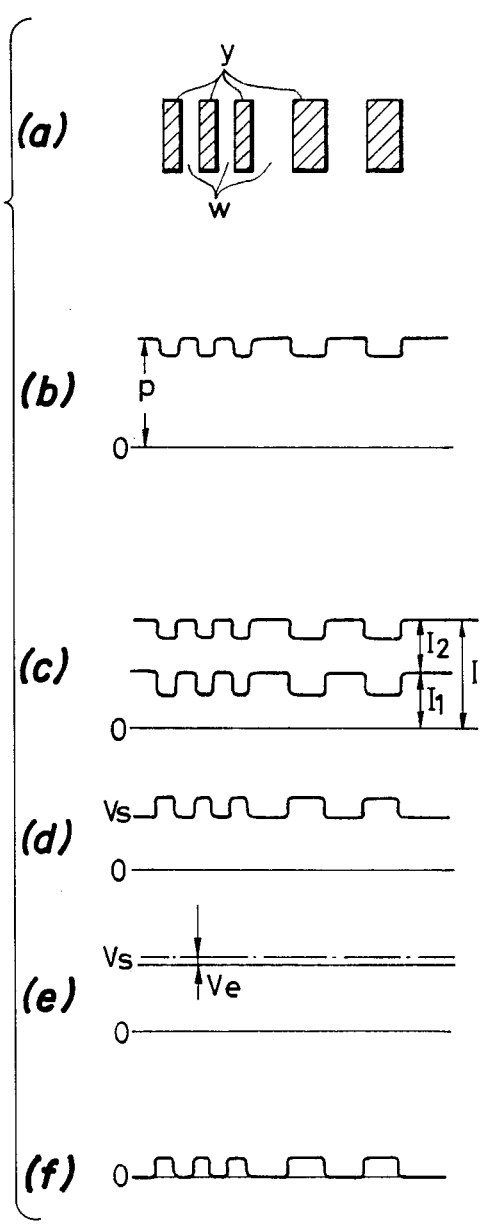
FIGS. 10a–f and 11a–f are waveform charts for explaining operations of the embodiment of FIG. 9.
Figure 11:
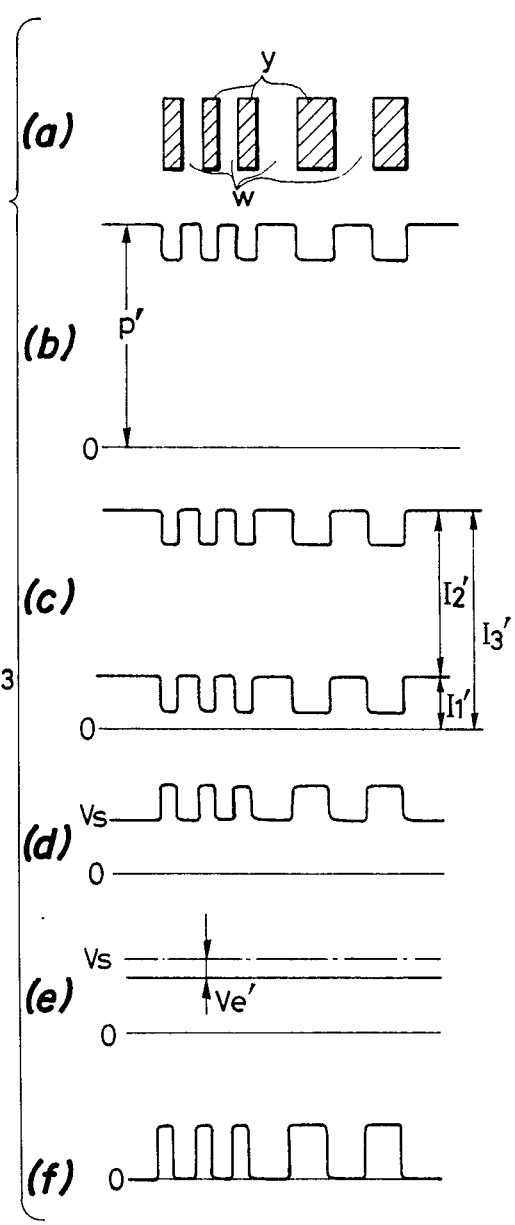

A third embodiment of the present invention will be described below with reference to FIGS. 9 to 12. FIG. 9 is a circuit diagram of an embodiment of the signal processing apparatus, FIG. 10 is a chart for explaining the operation of the apparatus of FIG. 9 when the quantity of light received by the phototransistor is small, and FIG. 11 is a chart for explaining the operation of the apparatus of FIG. 9 when the quantity of light received by the phototransistor is large.

The construction will first be described with reference to FIG. 9. The light emitted from an LED 1 to irradiate a bar code surface is reflected by the bar code surface to be received by a phototransistor 2 as a photosensor. The collector of the phototransistor 2 is connected with the power supply terminal and the emitter is connected to the inverting input of a first operational amplifier 10 and to the output terminal of the first operational amplifier 10 through a resistor (of e.g. 100 KΩ) 11, and further, to the output terminal of a third operational amplifier 13 through a resistor (of e.g. 1 KΩ). The output terminal of the first operational amplifier 10 is connected to the noninverting input of a fourth operational amplifier 14 and also connected to the noninverting input of a second operational amplifier 15. And, the noninverting input of the first operational amplifier 10 is connected with a reference voltage circuit 16 outputting a reference voltage $V_S$. The output terminal of the second operational amplifier 15 is connected with the cathode of a diode 17 and the anode of this diode 17 is connected with the noninverting input of the second operational amplifier 15. And, the anode of the diode 17 is connected with the noninverting input of the third operational amplifier 13 through a resistor 18. The noninverting input of the third operational amplifier 13 is connected with the reference voltage circuit 16 through a parallel connection of a capacitor 19 and a resistor 20 and the inverting input is connected with the reference voltage circuit 16 through a resistor 21 and with the output terminal thereof through a resistor 22. And, the noninverting input of the fourth operational amplifier 14 is connected to the reference voltage circuit 16 through a resistor 23 and also connected to the output terminal through a resistor 24. Further, the output terminal of the fourth operational amplifier 14 is connected to an output terminal 25.

With such arrangement, a current/voltage conversion circuit is formed of the first operational amplifier 10 the noninverting input thereof being supplied with the reference voltage $V_S$ and the resistor 11, a voltage variation detection circuit operative in response to a voltage variation in the direction to fall of the output voltage of the first operational amplifier 10 is formed of the second operational amplifier 15 and the diode 17, a voltage holding circuit is formed of the parallel connection of the capacitor 19 and the resistor 20 one end thereof being supplied with the reference voltage $V_S$, a first differential amplifier circuit is formed of the third operational amplifier 13 and the resistors 21, 22, and a second differential amplifier circuit is formed of the fourth operational amplifier 14 and the resistor 23, 24. The capacitor 19 is provided with a large discharging time constant by the resistor 20.

Now, with the power turned on, if the phototransistor 2 is not confronting the bar code surface, the phototransistor 2 receives the ambient disturbance light. Then, the reference voltage $V_S$ output from the reference voltage circuit 16 is supplied through resistors 20, 21, 22 to the noninverting input, inverting input, and the output terminal of the third operational amplifier 13 and its output terminal obtains the reference voltage $V_S$. Thereupon, a current flows from the power supply terminal to the output terminal of the third operational amplifier 13, and thereby, the potential at the inverting input of the first operational amplifer 10 becomes higher than the reference voltage $V_S$ and as a result the first operational amplifier 10 tends to output an "L" level voltage. Then, a current $I_1$ flows from the inverting input to the output terminal through the resistor 11, and, according to the magnitude of this current, the potential at the output terminal is established. Since this output voltage is lower than the reference voltage $V_S$ and the anode of the diode 17 is supplied with the reference voltage $V_S$, the output of the second operational amplifier 15 becomes an "L" level voltage to render the diode 17 conductive, whereby the output of the second operational amplifier 15 is integrated by the resistor 18 and the capacitor 19, and thus, the capacitor 19 is charged through the diode 17 disposed in the forward direction. Thereupon, the noninverting input of the third operational amplifier 13 is supplied with a voltage equal to the reference voltage $V_S$ less the potential difference across the capacitor 19, and the voltage equal to the reference voltage $V_S$ less the potential difference $V_e$ is output at the output terminal to increase the current $I_2$ passing through the resistor 12. As a result, the potential at the inverting input of the first operational amplifier 10 is lowered and the current $I_1$ flowing through the resistor 11 is decreased, and thereby, the output voltage at the output terminal is raised and becomes equal to the reference voltage $V_S$.

Now, the operation when the quantity of light received by the phototransistor 2 is small will be described with reference to FIG. 10.

The phototransistor 2 disposed to face the bar code surface scans the bar code with white portions w and black portions y alternately arranged thereon as shown in FIG. 10(a), starting from the white ground portion. When the phototransistor 2 faces the white portion w, the reflected light becomes strong, i.e., the phototransistor 2 receives the quantity of light at the level p as shown in FIG. 10(b). Thereupon, the impedance of the phototransistor 2 is lowered to increase the current $I_3$ flowing therethrough, whereby the potential at the inverting input of the first operational amplifier 10 tends to rise to increase the current $I_1$ flowing through the resistor 11 and lower the output voltage at the output terminal. Thus, the output terminal of the second operational amplifier 15 is brought to an "L" level and the output therefrom is integrated by the capacitor 19 resulting in a rise in the potential difference across the capacitor 19, and thereby, a still lower output voltage is provided at the output terminal of the third operational amplifier 13. As a result, the current $I_2$ flowing through the resistor 12 increases, so that, while the potential at the inverting input of the first operational amplifier 10 is maintained, the current $I_1$ flowing through the resistor 11 is also maintained constant, and thus, the output voltage at the output terminal is kept equal to the reference voltage $V_S$.

Then, if the phototransistor 2 is made to scan the bar code, the quantity of received light decreases at the black portion y as shown in FIG. 10(b) and the impedance of the phototransistor 2 increases. Then, the current $I_3$ flowing through the phototransistor 2 is decreased as shown in FIG. 10(c), whereby the potential at the inverting input of the first operational amplifier 10 tends to fall to decrease the current $I_1$ flowing through the resistor 11 and raise the output voltage at the output terminal higher than the reference voltage $V_S$. At this time, the second operational amplifier 15 outputs an "H" level voltage but the current flowing into the capacitor 19 is blocked up by the diode 17. Therefore, the voltage held as the potential difference across the capacitor 19 remains unchanged and the potential difference $V_e$ between the output voltage of the third operational amplifier 13 and the reference voltage $V_S$ is kept unchanged as shown in FIG. 10(e), and consequently the current $I_2$ flowing through the resistor 12 is kept unchanged. Hence, the $I_1$ flowing through the resistor 11 is not maintained constant but decreased. So that, the output voltage at the output terminal of the first operational amplifier 10 becomes higher than the reference voltage $V_S$ as shown in FIG 10(d). The quantity of received light increases at the next white portion w when the bar code is further scanned whereby the impedance of the phototransistor 2 is decreased. Thereupon, the current $I_3$ flowing through the phototransistor 2 increases to increase the current $I_1$ flowing through the resistor 11, and thereby, the output voltage at the output terminal is lowered to the reference voltage $V_S$. Therefore, at the black portion y of the bar code, an output as a signal at a higher voltage than the reference voltage $V_S$ appears at the output terminal of the first operational amplifier 10. And, the difference voltage between the output voltage of the first operational amplifier 10 and the reference voltage $V_S$ is amplified in the fourth operational amplifier 14 to be output therefrom, and thus, only the A.C. component corresponding to the changes in the impedance of the phototransistor 2 as shown in FIG. 10(f) is output as the signal at the output terminal 25.

Further, the operation when the quantity of light received by the phototransistor 2 is larger will be described with reference to FIG. 11.

When the phototransistor 2 facing the bar code surface of FIG 11(a) receives from the white portion w a quantity of light at a higher level p' as shown in FIG. 11(b), the impedance of the phototransistor 2 is greatly lowered. As a result, the current $I_3'$ flowing through the phototransistor 2 becomes as large as shown in FIG. 11(c), whereby also the potential at the inverting input of the first operational amplifier 10 tends to rise to increase the current $I_1'$ flowing through the resistor 11, so that the output voltage is greatly lowered. Then, the output terminal of the second operational amplifier 15 is brought to an "L" level, the potential difference across the capacitor 19 is increased, the potential difference $V_e'$ between the output voltage of the third operational amplifier 13 and the reference voltage $V_S$ is raised as shown in FIG. 11(e), the output voltage of the third operational amplifier 13 is lowered, and the current $I_2'$ flowing through the resistor 12 is increased. Thus, the potential difference $V_e'$ between the output voltage of the third operational amplifier 13 and the reference voltage $V_S$ is raised, the output voltage of the third operational amplifier 13 is lowered, and the current $I_2'$ is increased as shown in FIG. 11(c) until the output voltage at the output terminal of the first operational amplifier 10 is brought equal to the reference voltage $V_S$. Then, if the phototransistor 2 is made to scan the bar code, the quantity of received light is decreased at the black portion y, the impedance of the phototransistor 2 is increased to decrease the current $I_3'$. Thereby, the potential at the inverting input of the first operational amplifier 10 tends to fall to decrease the current $I_1'$ flowing through the resistor 11 and raise the voltage as the output terminal. At this time, the potential difference $V_e'$ between the output voltage of the third operational amplifier 13 and the reference voltage $V_S$ is kept unchanged by being blocked by the diode 17 and the current $I_1'$ flowing through the resistor 11 is not maintained constant but decreased. As a result, an output is provided at the output terminal of the first operational amplifier 10 as a signal having a higher voltage than the reference voltage $V_S$ at the black portion y of the bar code as shown in FIG. 11(d), and further, the difference voltage between that output voltage and the reference voltage $V_S$ is amplified in the fourth operational amplifier 14, and thus, only the A.C. component corresponding to the changes in the impedance of the phototransistor 2 as shown in FIG. 11(f) is output as the signal at the output terminal 25. And, the larger the quantity of received light by the phototransistor 2, the higher becomes the voltage of the signal of only A.C. component output at the output terminal 25 at the black portion y.

Although the above described embodiment has been arranged such that the black portion y is detected as the signal with the impedance of the phototransistor 2 at the white portion w taken as reference, it is possible to detect the white portion w as the signal with the impedance of the phototransistor 2 at the black portion y taken as reference by disposing the diode 17 in the reverse direction.

Figure 12:
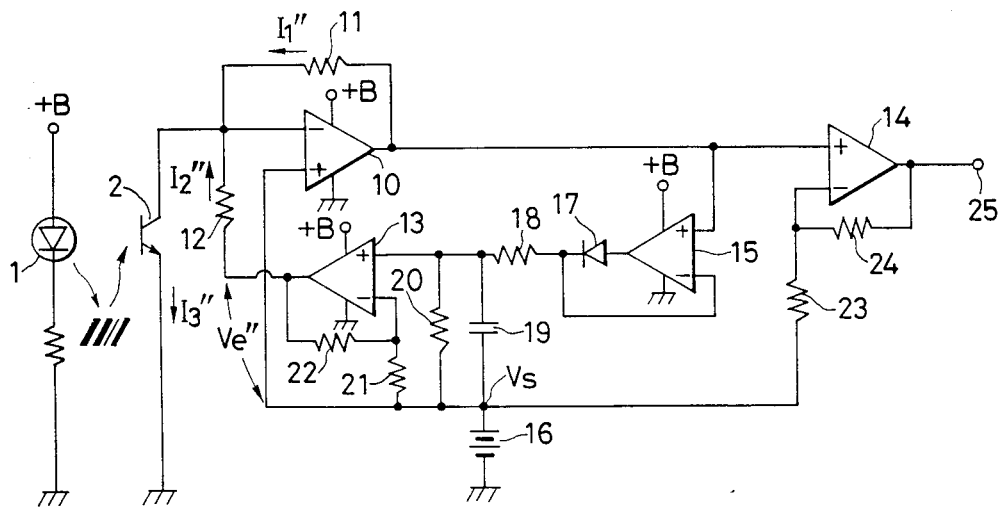
FIG. 12 is a circuit diagram for a variation of the embodiment of FIG. 9.

FIG. 12 is a circuit diagram showing a variation of the above described embodiment of the signal processing apparatus. The circuit elements in FIG. 12 like those in FIG. 9 are denoted by like reference numerals and duplicate description for the same will be omitted.

What are different in FIG. 12 from FIG. 9 are that the collector of the phototransistor 2 is connected to the inverting input of the first operational amplifier 10 and the emitter is grounded, and further, that the output terminal of the second operational amplifier 15 is connected to the anode of the diode 17 and the cathode of the diode 17 is connected through the resistor 18 to the noninverting input of the third operational amplifier 13.

With such arrangement having the power turned on, a current flows from the output terminal of the third operational amplifier 13 through the resistor 12 against a certain impedance value of the phototransistor 2 to lower the potential at the inverting input of the first operational amplifier 10 than the reference voltage $V_S$, and thereby, the first operational amplifier 10 tends to output an "H" level voltage at the output terminal and the output voltage is established by the current $I_1''$ flowing through the resistor 11. Then, the second operational amplifier 15 outputs an "H" level voltage and this output charges the capacitor 19 through the diode 17 disposed in the forward direction, and thereby, a higher voltage than the reference voltage $V_S$ is output from the second operational amplifier 13. Then, the potential at the inverting input of the first operational amplifier 10 is raised to decrease the current $I_1''$ flowing through the resistor 11, and thus, the output voltage at the output terminal of the first operational amplifier 10 is lowered so as to agree with the reference voltage $V_S$.

Then, if the phototransistor 2 is made to scan the bar code, the phototransistor 2 facing the white portion w receives strong reflected light to lower the impedance of the same and increase the current $I_3''$ flowing therethrough, and thereby, the potential at the inverting input of the first operational amplifier 10 tends to fall to increase the current $I_1''$ flowing through the resistor 11 and raise the output voltage at the output terminal. So that, the output terminal of the second operational amplifier 15 is brought to an "H" level and this output is integrated by the capacitor 19 to increase the potential difference across the capacitor 19 and thus a still higher output voltage appears at the output terminal of the third operational amplifier 13. As the result, the current $I_2''$ flowing through the resistor 12 is increased, whereby the potential at the inverting input of the first operational amplifier 10 is maintained, the current $I_1''$ flowing through the resistor 11 is also maintained constant, and the output voltage at the output terminal is kept unchanged to remain equal to the reference voltage $V_S$.

And, at the black portion y, the impedance of the phototransistor 2 is increased to decrease the current $I_3''$, and thereby the current $I_1''$ flowing through the resistor 11 is decreased and the output voltage at the output terminal is lowered. Although the second operational amplifier 15 outputs an "L" level voltage, the potential difference across the capacitor 19 is kept unchanged by being blocked by the diode 17 and the output voltage of the third operational amplifier 13 is kept unchanged. As a result, an output as a signal having a lower voltage than the reference voltage $V_S$ at the black portion y of the bar code is provided at the output terminal of the first operational amplifier 10, and the difference voltage between that output voltage and the reference voltage $V_S$ is amplified in the fourth operational amplifier 14, and thus, only the A.C. component corresponding to the changes in the impedance of the phototransistor 2 is output as the signal at the output terminal 25.

Also in the case of the above described embodiment of FIG. 12, it is possible to detect the white portion w as the signal with the black portion y taken as reference by reversing the direction of the diode 17.

Figure 13:
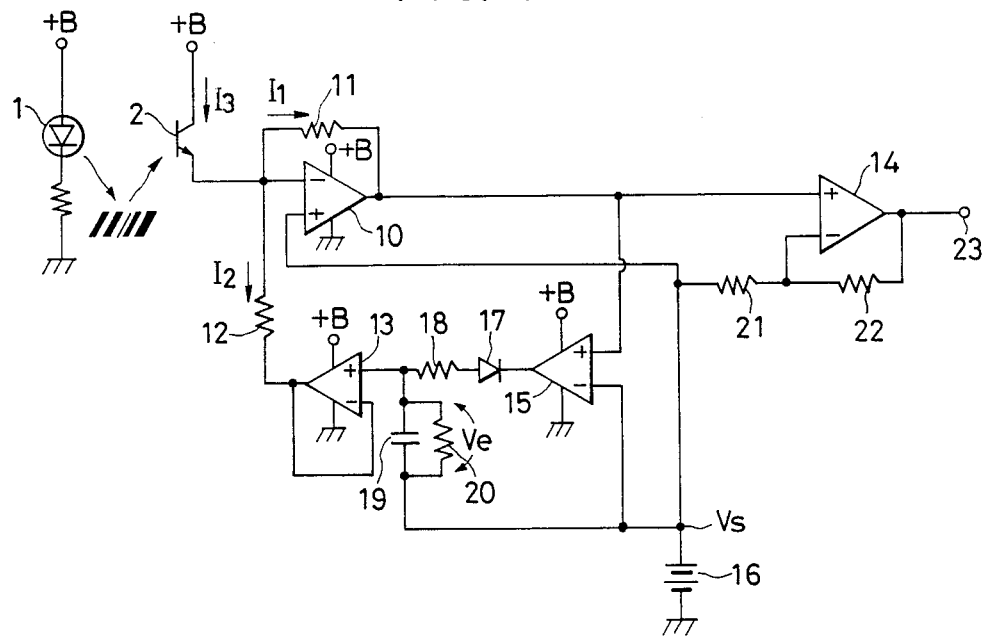
FIG. 13 is a circuit diagram for a fourth embodiment.
Figure 14:
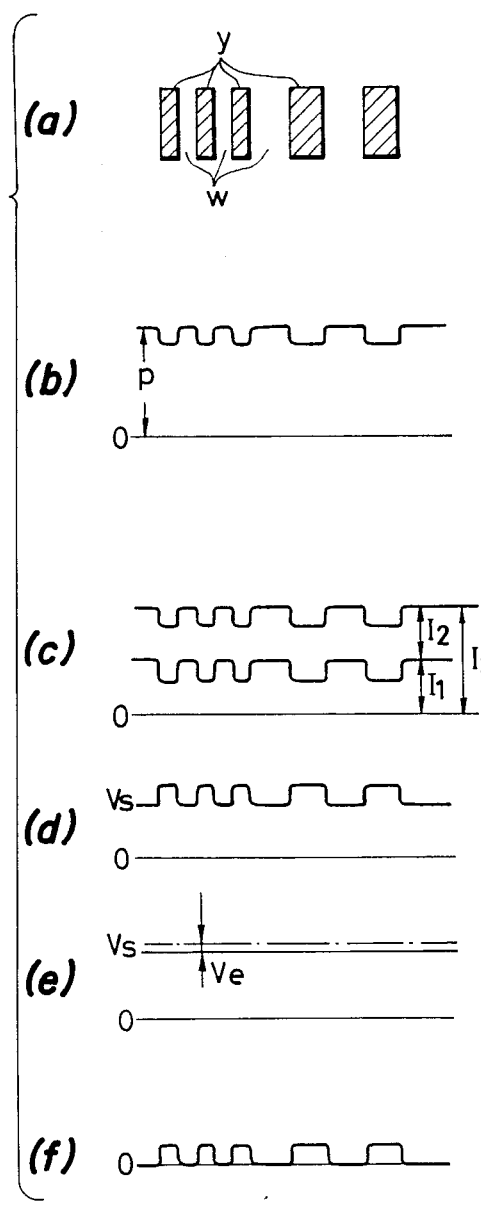
FIGS. 14a–f and 15a–f are waveform charts for explaining operations of the embodiment of FIG. 13.
Figure 15:
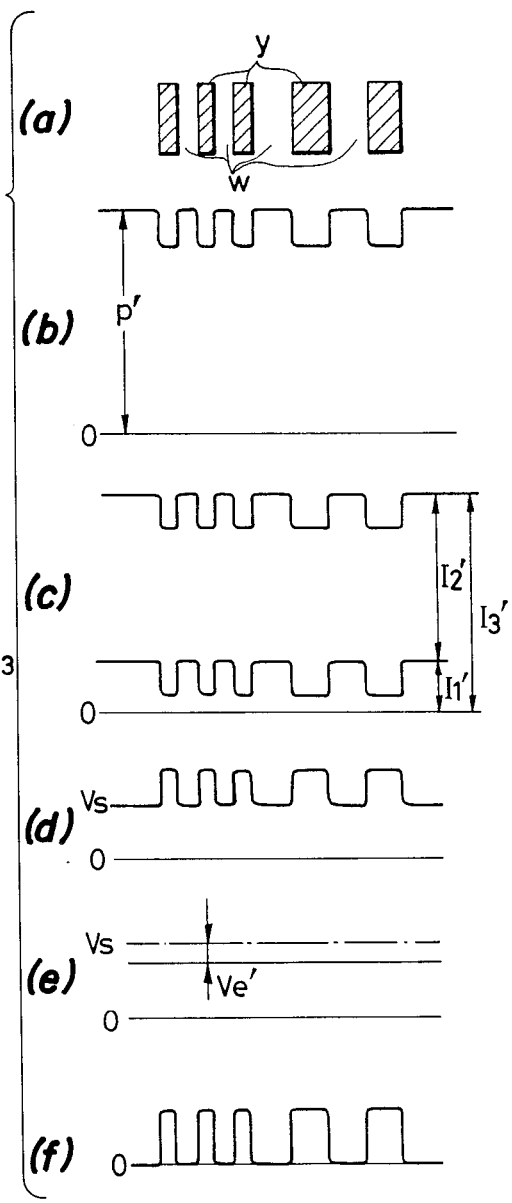

A fourth embodiment of the present invention will by described below with reference to FIGS. 13 to 16. FIG. 13 is a circuit diagram of an embodiment of the signal processing apparatus of the present invention, FIG. 14 is a chart for explaining the operation when the quantity of light received by the phototransistor is small, and FIG. 15 is a chart for explaining the operation when the quantity of light received by the phototransistor is large.

The construction will first be described with reference to FIG. 13. The light emitted from an LED 1 to irradiate a bar code surface is reflected by the bar code surface to be received by a phototransistor 2 as a photosensor. The collector of the phototransistor 2 is connected with the power supply terminal and the emitter is connected to the inverting input of a first operational amplifier 10 and to the output terminal of the first operational amplifier 10 through a resistor (of e.g. 100 KΩ) 11, and further, to the output terminal of a second operational amplifier 13 through a resistor (of e.g. 1 KΩ). The output terminal of teh first operational amplifier 10 is connected to the noninverting input of a fourth operational amplifier 14 and also connected to the noninverting input of a third operational amplifier 15. The inverting input of the third operational amplifier 15 and the noninverting input of the first operational amplifier 10 are connected with a reference voltage circuit 16 outputting a reference voltage $V_S$. The output terminal of the third operational amplifier 15 is connected with the cathode of a diode 17 and the anode of this diode 17 is connected through a resistor 18 with the noninverting input of the second operational amplifier 13. The noninverting input of the second operational amplifier 13 is connected with the reference voltage circuit 16 through a parallel connection of a capacitor 19 and a resistor 20 and the inverting input is connected with the output terminal. And, the noninverting input of the fourth operational amplifier 14 is connected to the reference voltage circuit 16 through a resistor 21 and also connected to the output terminal thereof through a resistor 22. Further, the output terminal of the fourth operational amplifier 14 is connected to an output terminal 23.

With such arrangement, a current/voltage conversion circuit is formed of the first operational amplifier 10 the noninverting input thereof being supplied with the reference voltage $V_S$ and the resistor 11, a buffer circuit is formed of the second operational amplifier 13, a comparison circuit is formed of the third operational amplifier 15 to which the output voltage of the first operational amplifier 10 and the reference voltage $V_S$ are supplied, a rectifier circuit is formed of the diode 17, a voltage holding circuit is formed of the parallel connection of the capacitor 19 and the resistor 20 one end thereof being supplied with the reference voltage $V_S$, and a differential amplifier circuit is formed of the fourth operational amplifier 14 and the resistor 21, 22. The capacitor 19 is provided with a large discharging time constant by the resistor 20.

Now, with the power turned on, if the phototransistor 2 is not confronting the bar code surface, the phototransistor 2 receives the ambient disturbance light. Then, the reference voltage $V_S$ output from the reference voltage circuit 16 is supplied through resistors 20 to the noninverting input of the second operational amplifier 13 and its output terminal obtains the reference voltage $V_S$. Thereupon, a current flows from the power supply terminal to the output terminal of the second operational amplifier 13, and thereby, the potential at the inverting input of the first operational amplifier 10 becomes higher than the reference voltage $V_S$ and as a result the first operational amplifier 10 tends to output an "L" level voltage. Then, a current $I_1$ flows from the inverting input to the output terminal through the resistor 11, and, according to the magnitude of this current, the potential at the output terminal is established. Since this output voltage is lower than the reference voltage $V_S$, the output of the third operational amplifier 15 becomes an "L" level voltage to render the diode 17 conductive, whereby the output of the third operational amplifier 15 is integrated by the resistor 18 and the capacitor 19, and thus, the capacitor 19 is charged through the diode 17 disposed in the forward direction. Thereupon, the noninverting input of the second operational amplifier 13 is supplied with a voltage equal to the reference voltage $V_S$ less the potential difference $V_e$ across the capacitor 19, and the voltage equal to the reference voltage $V_S$ less the potential difference $V_e$ is output therefrom to increase a current $I_2$ passing through the resistor 12. As a result, the potential at the inverting input of the first operational amplifier 10 is lowered and the current $I_1$ flowing through the resistor 11 is decreased, and thereby, the output voltage at the output terminal is raised and brought equal to the reference voltage $V_S$.

Now, the operation when the quantity of received light by the phototransistor 2 is small will be described with reference to FIG. 14.

The phototransistor 2 disposed to face the bar code surface scans the bar code with white portions w and black portions y alternately arranged thereon as shown in FIG. 14(a), starting from the white ground portion. When the phototransistor 2 faces the white ground portion, the reflected light becomes strong, i.e., the phototransistor 2 receives the quantity of light at the level p as shown in FIG. 14(b). Thereupon, the impedance of the phototransistor 2 is lowered to increase the current $I_3$ flowing therethrough, whereby the potential at the inverting input of the first operational amplifier 10 tends to rise to increase the current $I_1$ flowing through the resistor 11 and lower the output voltage at the output terminal. Thus, the output terminal of the third operational amplifier 15 is brought to an "L" level and the output therefrom is integrated by the capacitor 19 resulting in a rise in the potential difference $V_e$ across the capacitor 19, and thereby, a still lower output voltage appears at the output terminal of the second operational amplifier 13. As a result, the current $I_2$ flowing through the resistor 12 increases, so that, while the potential at the inverting input of the first operational amplifier 10 is maintained, the current $I_1$ flowing through the resistor 11 is also maintained constant, and thus, the output voltage at the output terminal is kept equal to the reference voltage $V_S$.

Then, if the phototransistor 2 is made to scan the bar code, the quantity of received light decreases at the black portion y as shown in FIG. 14(b) and the impedance of the phototransistor 2 increases. Then, the current $I_3$ flowing through the phototransistor 2 is decreased as shown in FIG. 14(c), whereby the potential at the inverting input of the first operational amplifier 10 tends to fall to decrease the current $I_1$ flowing through the resistor 11 and raise the output voltage at the output terminal higher than the reference voltage $V_S$. At this time, the third operational amplifier 15 outputs an "H" level voltage but the current flowing into the capacitor 19 is blocked up by the diode 17. Therefore, the potential difference $V_e$ across the capacitor 19 is kept unchanged as shown in FIG. 14(e) and the output voltage of the second operational amplifier 13 is kept unchanged, and consequently the current $I_2$ flowing through the resistor 12 is kept unchanged. Hence, the $I_1$ flowing through the resistor 11 is not maintained constant but decreased. So that, the output voltage at the output terminal of the first operational amplifier 10 becomes higher than the reference voltage $V_S$ as shown in FIG. 14(d). Therefore, at the black portion y of the bar code, an output as a signal at a higher voltage than the reference voltage $V_S$ appears at the output terminal of the first operational amplifier 10. And, the difference voltage between the output voltage of the first operational amplifier 10 and the reference voltage $V_S$ is amplified in the fourth operational amplifier 14 to be output therefrom, and thus, only the A.C. component corresponding to the changes in the impedance of the phototransistor 2 as shown in FIG. 14(f) is provided as the signal at the terminal 23.

Further, the operation when the quantity of received light by the phototransistor 2 is large will be described with reference to FIG. 15.

When the phototransistor 2 facing the bar code surface receives from the white portion w a quantity of light at a higher level p' as shown in FIG. 15(b), the impedance of the phototransistor 2 is greatly lowered. As a result, the current $I_3'$ flowing through the phototransistor 2 becomes as large as shown in FIG. 15(c), whereby also the potential at the inverting input of the first operational amplifier 10 tends to rise to increase the current $I_1'$ flowing through the resistor 11, so that the output voltage is greatly lowered. Then, the output terminal of the third operational amplifier 15 is brought to an "L" level, the potential difference $V_e'$ across the capacitor 19 is raised as shown in FIG. 15(e), the output voltage of the second operational amplifier 13 is lowered, and the current $I_2'$ flowing through the resistor 12 is increased. Thus, the potential difference $V_e'$ across the capacitor 19 is raised, the output voltage of the second operational amplifier 13 is lowered, and the current $I_2'$ is increased as shown in FIG. 15(c) until the output voltage at the output terminal of the first operational amplifier 10 is brought equal to the reference voltage $V_S$. Then, if the phototransistor 2 is made to scan the bar code, the quantity of received light is decreased at the black portion y, the impedance of the phototransistor 2 is increased to decrease the current $I_3'$. Thereby, the potential at the inverting input of the first operational amplifier 10 tends to fall to decrease the current $I_1'$ flowing through the resistor 11 and raise the voltage at the output terminal. At this time, the potential difference $V_e'$ across the capacitor 19 is kept unchanged and the current $I_1'$ flowing through the resistor 11 is not maintained constant but decreased. As a result, an output is provided at the output terminal of the first operational amplifier 10 as a signal having a higher voltage than the reference voltage $V_S$ at the black portion y of the bar code as shown in FIG. 15(d), and further, the difference voltage between this output voltage and the reference voltage $V_S$ is amplified in the fourth operational amplifier 14, and thus, only the A.C. component corresponding to the changes in the impedance of the phototransistor 2 as shown in FIG. 15(f) is output as the signal at the output terminal 23. And, the larger the quantity of light received by the phototransistor 2, the higher becomes the voltage of the signal of only A.C. component output at the output terminal 23 at the black portion y.

Although the above described embodiment has been arranged such that the black portion y is detected as the signal with the impedance of the phototransistor 2 at the white portion w taken as reference, it is possible to detect the white portion w as the signal with the impedance of the phototransistor 2 at the black portion y taken as reference by disposing the diode 17 in the reverse direction.

Figure 16:
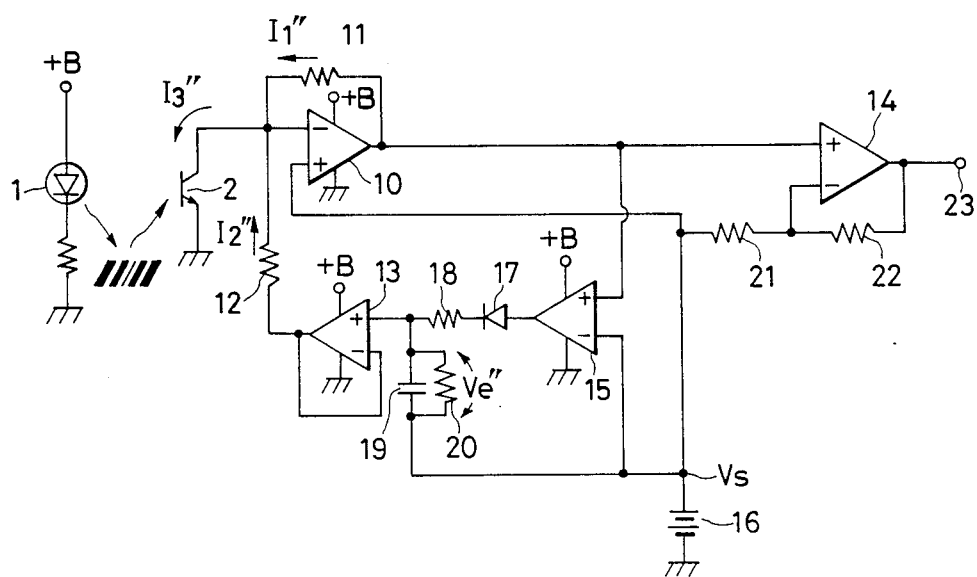
FIG. 16 is a circuit diagram for a variation of the embodiment of FIG. 13.

FIG. 16 is a circuit diagram showing a variation of the above described embodiment of the signal processing apparatus. The circuit elements in FIG. 16 like those in FIG. 13 are denoted by like reference numerals and duplicate description for the same will be omitted.

What are different in FIG. 16 from FIG. 13 are that the collector of the phototransistor 2 is connected to the inverting input of the first operational amplifier 10 and the emitter is grounded, and further, that the output of the third operational amplifier 15 is connected to the anode of the diode 17 and the cathode of the diode 17 is connected through the resistor 18 to the noninvering input of the second operational amplifier 13.

With such arrangement having the power turned on, a current flows from the output terminal of the second operational amplifier 13 through the resistor 12 aganist a certain impedance value of the phototransistor 2 to lower the potential at the inverting input of the first operational amplifier 10 than the reference voltage $V_S$, and thereby, the first operational amplifier 10 tends to output an "H" level voltage at the output terminal and the output voltage is established by the current $I_1''$ flowing through the resistor 11. Then, the third operational amplifier 15 outputs an "H" level voltage and this output is integrated such that the capacitor 19 is charged through the diode 17, and thereby, a higher voltage than the reference voltage $V_S$ is output from the second operational amplifier 13. Then, the potential at the inverting input of the first operational amplifier 10 is lowered to decrease the current $I_1''$ flowing through the resistor 11, and thus, the output voltage at the output terminal of the first operational amplifier 10 is brought into agreement with the reference voltage $V_S$.

Then, if the phototransistor 2 is made to scan the bar code, the phototransistor 2 facing the white portion w receives strong reflected light to lower the impedance of the same and increase the current $I_3''$ flowing therethrough, and thereby, the potential at the inverting input of the first operational amplifier 10 tends to fall to increase the current $I_1''$ flowing through the resistor 11 and raise the output voltage at the output terminal. So that, the output terminal of the third operational amplifier 15 is brought to an "H" level and this output is integrated by the capacitor 19 to increase the potential difference $V_e''$ across the capacitor 19 and thus a still higher output voltage is output at the output terminal of the second operational amplifier 13. As the result, the current $I_2''$ flowing through the resistor 12 is increased, whereby the potential at the inverting input of the first operational amplifier 10 is maintained, the current $I_1''$ flowing through the resistor 11 is also maintained constant, and the output voltage at the output terminal is kept unchanged to remain equal to the reference voltage $V_S$.

And, at the black protion y, the impedance of the phototransistor 2 is increased to decrease the current $I_3''$, and thereby, the current $I_1''$ flowing through the resistor 11 is decreased and the output voltage at the output terminal is lowered. Although the third operational amplifier 15 outputs an "L" level voltage, the potential difference $V_e''$ across the capacitor 19 is kept unchanged by being blocked by the diode 17 and the output voltage of the second operational amplifier 13 is kept unchanged. As a result, an output as a signal having a lower voltage than the reference voltage $V_S$ at the black portion y of the bar code is provided at the output terminal of the first operational amplifier 10, and the difference voltage between this output voltage and the reference voltage $V_S$ is amplified in the fourth operational amplifier 14, and thus, only the A.C. component corresponding to the changes in the impedance of the phototransistor 2 is output as the signal at the output terminal 23.

Also in the case of the above described embodiment of FIG. 16, it is possible to detect the white portion w as the signal with the black portion y taken as reference by reversing the direction of the diode 17.

Figure 17:
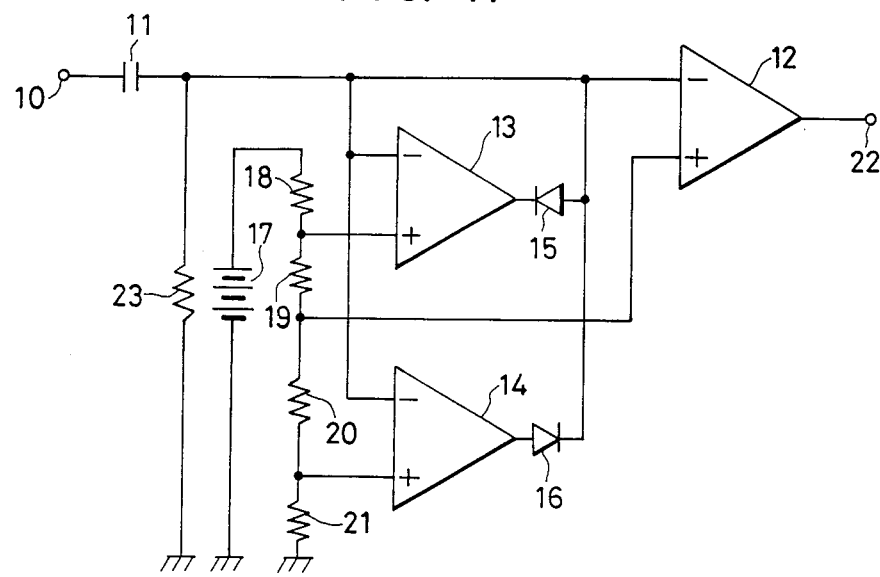
FIG. 17 is a circuit diagram for a fifth embodiment.
Figure 18:
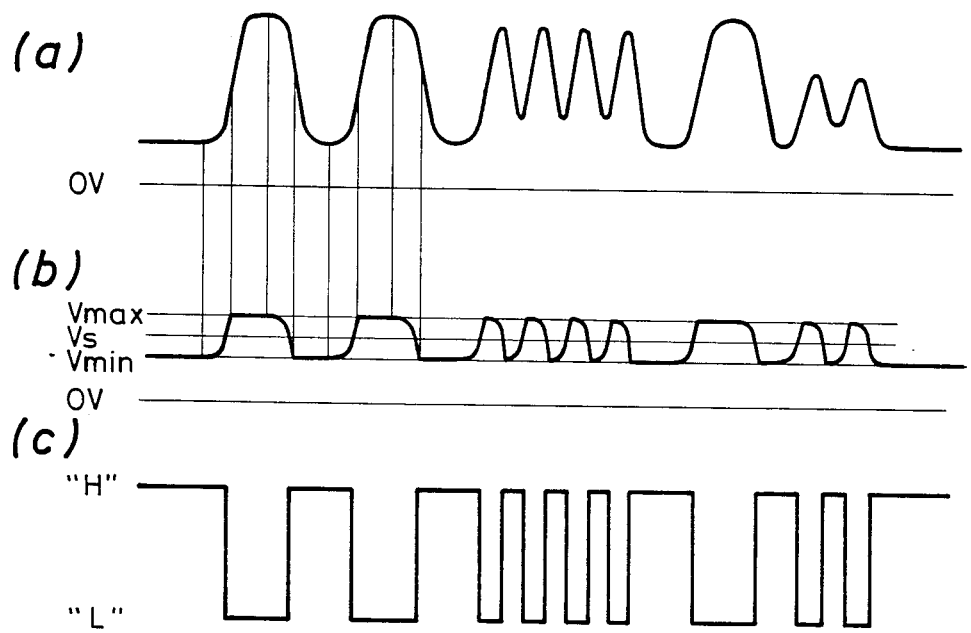
FIG. 18a–c, are waveform charts explaining operations of the embodiment of FIG. 17.
Figure 19:
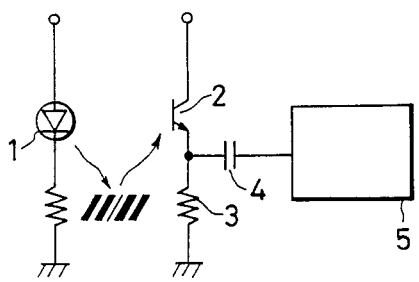
FIGS. 19 to 22 are diagrams showing prior art examples.
Figure 20:
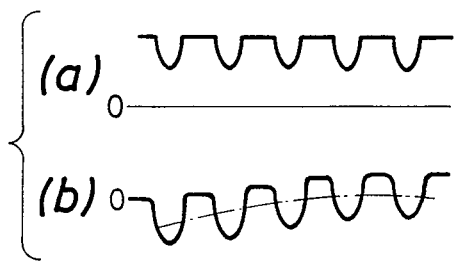
Figure 21:
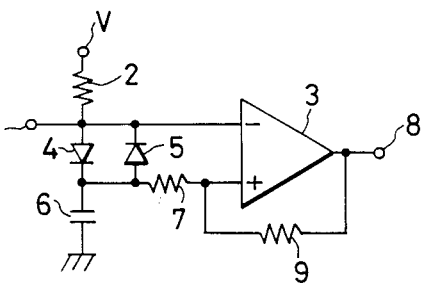
Figure 22:
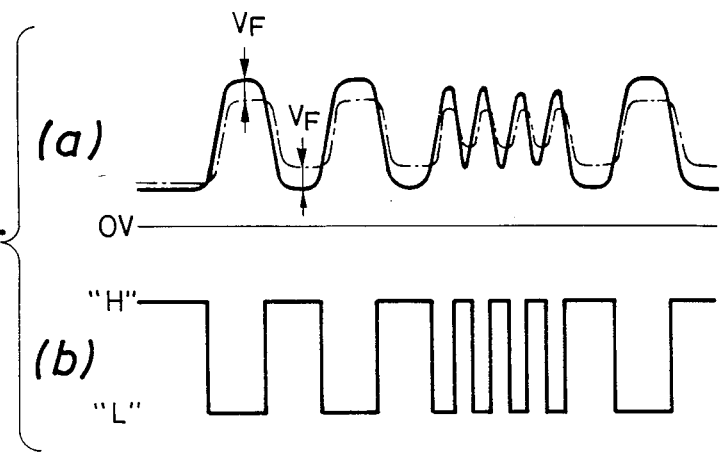

A fifth embodiment of the present invention will be described with reference to FIGS. 17 and 18. FIG. 17 is is a circuit diagram of an embodiment of a binary encoding circuit of the present invention and FIG. 18 is a waveform chart explaining the operation of the circuit of FIG. 17.

Referring to FIG. 17, a signal input terminal 10 to which an input signal is supplied is connected through a direct current blocking capacitor 11 to the negative input of each of first, second, and third comparators 12, 13, and 14. The output terminal of the second comparator 13 and the output terminal of the third comparator 14 are connected with the negative input of the first comparator 12 through a first diode 15 disposed in the reverse direction and through a second diode 16 disposed in the forward direction, respectively. And, the positive terminal of a battery 17 with its negative terminal grounded is grounded through resistor 18, 19, 20, 21 connected in series. The junction between the resistors 18 and 19 is connected with the positive input of the second comparator 13, the junction between the resistors 19 and 20 is connected with the positive input of the first comparator 12, and the junction of the resistors 20 and 21 is connected with the positive input of the third comparator 14. Further, the output terminal of the first comparator 12 is connected with a signal output terminal 22 and the negative input is grounded through a resistor 23.

With such arrangement, by divided voltages by the resistors 18-21, the voltages supplied to the positive inputs of the first, second, and third comparators 12, 13, and 14 are established. And, by making the resistance values of the resistors 19 and 20 equal to each other, it is adapted such that the second comparator 13 is supplied with an upper limit voltage $V_{max}$, which is a predetermined potential difference higher than a reference voltage $V_s$ supplied to the first comparator 12, and the third comparator 14 is supplied with a lower limit voltage $V_{min}$, which is the predetermined potential difference lower than the reference voltage $V_s$. Here, the second comparator 13 and first diode 15 and the third comparator 14 and second diode 16 form a first and second ideal diodes, respectively, and the upper limit voltage $V_{max}$ and the lower limit voltage $V_{min}$ are connected with the negative input of the first comparator 12 through a first ideal diode disposed in the reverse direction and through a second ideal diode disposed in the forward direction, respectively.

Now, if an input signal as shown in FIG. 18(a) is supplied to the signal input terminal 10, the voltage at the negative input of the first comparator 12 provides a signal as shown in FIG. 18(b), in which the rising A.C. component in the input signal is clamped at the upper limit voltage $V_{max}$ and the falling A.C. component varies from the upper limit voltage $V_{max}$ to the lower limit voltage $V_{min}$ where it is clamped.

Consequently, a binary signal as shown in FIG. 18(c) in which "H" and "L" output levels are switched to each other every time the varying voltage at the negative input of the first comparator 12 crosses the reference voltage $V_s$ at the positive input is output from the output terminal to the signal output terminal 22.

The predetermined potential difference of the upper limit voltage $V_{max}$ and the lower limit voltage $V_{min}$ with respect to the reference voltage $V_s$ can be suitably set to the voltage exceeding the hysteresis voltage of the first comparator 12 itself, e.g. 0.1 V, by selection of the resistors 18-21.

Then, if the signal has at least 0.2 V of the width of variation, it is sufficient for the input signal to be correctly converted to a binary signal. Therefore, when the binary encoding circuit of the present invention is used in a bar code reader, it is enough if the input signal is provided with 0.6-2 V of dynamic range even if the electrical signal output from a photosensor varies 3-10 times, so that, only a voltage as low as 3 V is required of the power supply voltage for the bar code reader. And, even if the terminal voltage of the battery 17 suffers a change, no change is produced in the upper limit voltage $V_{max}$ and the lower limit voltage $V_{min}$ relative to the reference voltage $V_s$ and the width of the variation of the A.C. component in the input signal to be converted to the binary signal is kept virtually constant, and hence, the pulse widths of the binary signal remain unchanged.

In the above described embodiment, although the ideal diodes are formed of the second comparator 13 and first diode 15 and of the third comparator 14 and second diode 16, the formation of the ideal diodes is not limited to such arrangements. And, although the reference voltage $V_s$, upper limit voltage $V_{max}$, and lower limit voltage $V_{min}$ are set up by divided voltages by the resistors 18-21, the way of setting up the voltages is not limited to such a method.

Although the above embodiments have been described as such as to read a bar code as the code to be detected by a photosensor, it will be apparent to those skilled in the art that the present invention is not limited to such a combination but applicable, for example, to one detecting a magnetic code by a magnetic sensor.

As described so far, according to the signal processing apparatus having the first technical means of the present invention, the signal corresponding to the changes in the impedance of the photosensor is output superposed on a predetermined reference voltage regardless of the quantities of light received by the photosensor and the like, and therefore, the signal can be positively detected by comparing such an output voltage with the reference voltage. Besides, since the reference voltage is set constant, it is not necessary to provide a large dynamic range, and therefore, the present invention provides such a good effect that it is suited for use in an apparatus having a low voltage battery or the like as the power source.

According to the signal processing apparatus having the second technical means of the present invention, only the A.C. component corresponding to the changes in the impedance of the photosensor is output as the signal regardless of the quantity of received light by the photosensor and the like, the present invention provides such a good effect that it is suited for use in an apparatus having a low voltage battery or the like as the power source.

Further, according to the binary encoding circuit having the third technical means of the present invention, small magnitude of variation of the A.C. component of an input signal can be correctly converted to a binary signal. And since the dynamic range in the input signal is not needed to be large, a good effect is provided that the apparatus using the binary encoding circuit operates well with a power source at a low voltage.

What is claimed is:

1. A binary encoder circuit comprising
   a capacitor for blocking a direct current;
   a comparator; and
   a first and a second ideal diode; wherein an input signal is supplied to one input of said comparator through said capacitor, a reference voltage is supplied to the other input of said comparator, an upper limit voltage a predetermined potential difference higher than said reference voltage and a lower limit voltage the predetermined potential difference lower than said reference voltage are supplied to said one input of said comparator through said first ideal diode disposed in the reverse direction and through said second ideal diode disposed in the forward direction, respectively, whereby a binary signal is output from the output terminal of said comparator.

2. A binary encoding circuit according to claim 1, wherein said reference voltage, upper limit voltage, and lower limit voltage are established by divided voltages by means of a plurality of resistors connected in series.

3. A signal processing circuit comprising:
   a sensing element 2 whose impedance is varied in response to a detected amount;
   a power supply for applying a power supply voltage +B to said sensing element 2;
   a comparator/amplifier means 10 having an inverting input terminal (−) coupled to receive a first voltage signal determined by current I3 flowing through said sensing element 2 in response to a variation of impedance of said sensing element 2;

a reference voltage generating means 16 for supplying a reference voltage VS to a non-inverting input terminal (+) of said comparator/amplifier means 10;

a first current feedback means 11 connected between an output terminal of said comparator/amplifier means 10 and said inverting input terminal (−) of said comparator/amplifier means 10 for generating a first feedback current I1 through said first current feedback means 11;

a correction voltage generating means 13, 15, 17, 18, 19, 20, 21, 22 having an input connected to said output terminal of said comparator/amplifier means 10 for comparing said output of said comparator/amplifier means 10 with said reference voltage VS and outputting a correction voltage for a correcting operation;

a second current feedback means 12 having a first terminal connected to receive said correction voltage and a second terminal connected to said inverting input terminal (−) of said comparator/amplifier means 10 for generating a second feedback current I2 in response to said correction voltage, said second feedback current I2 generated in response to said correction voltage acting to divide said current I3 flowing in response to a variation of impedance of said sensing element 2 so that a correction of said first feedback current I1 through said first current feedback means 11 is made in order to correct a voltage level at said output terminal of said comparator/amplifier means 10.

4. A signal processing circuit according to claim 3, wherein said correction voltage generating means comprises:

a comparator means 15 having a non-inverting input terminal (+) connected to said output terminal of said comparator/amplifier means 10 and an inverting input terminal (−) connected to said reference voltage VS;

a rectifier means 17 having a first input terminal connected to an output terminal of said comparator means 15; and a voltage holding means 18, 19, 20 connected to an output terminal of said rectifier means 17 for holding a correction voltage based on a comparison of said voltage level at said output terminal of said comparator/amplifier 10 with said reference voltage VS, said correction voltage held by said voltage holding means being coupled to said first terminal of said second current feedback means 12 in order to generate said second feedback current I2.

5. A signal processing circuit according to claim 4, wherein said sensing element 2 comprises a phototransistor 2 which is a light receiving element for receiving a reflected light in correspondence with a reflectivity of a surface of an optical recording medium radiated by an LED 1 acting as a light emitting element.

6. A signal processing circuit according to claim 5, wherein said optical recording medium is provided with bar codes in which reflective code and non-reflective code are alternately arranged.

7. A signal processing circuit according to claim 6, wherein said reference voltage VS outputting by said reference voltage generating means 16 is set lower than said power supply voltage +B.

8. A signal processing circuit according to claim 7, wherein said power supply has a negative pole connected to a common ground line and a positive pole +B connected to said sensing element 2, said comparator/amplifier means 10 and said correction voltage generating means.

9. A signal processing circuit according to claim 8, wherein said first current feedback means comprises a first fixed resistor 11 and said second current feedback means comprises a second fixed resistor 12 set at a lower resistance value than a value of said first fixed resistor 11.

10. A signal processing circuit according to claim 9, wherein said current I3 flowing in response to a variation of impedance of said sensing element 2 is substantially equivalent to a sum of said first feedback current I1 flowing through said first current feedback means 11 and said second feedback current I2 flowing through said second current feedback means 12.

11. A signal processing circuit according to claim 10, wherein said voltage holding means comprises:

a capacitor 19 to which said reference voltage VS is applied to one end thereof;

a charging resistor 18 having a first terminal connected to an other end of said capacitor 19 and having a second terminal connected to said output terminal of said rectifier means 17, said charging resistor 18 for setting a charging time constant of said capacitor 19; and a third resistor 20 connected in parallel with said capacitor 19, a common junction between said charging resistor 18 and said third resistor 20 providing said correction voltage for application to said second current feedback means 12.

12. A signal processing circuit according to claim 11, wherein said correction voltage generating means further comprises a buffer means 13 connected between said common junction of said charging resistor 18 and said third resistor 20 and said second current feedback means 12.

13. A signal processing circuit according to claim 12 further comprising:

a differential amplifying means 14 having a non-inverting input terminal (+) coupled to said output terminal of said comparator/amplifier means 10 and having an inverting input terminal (−) coupled to said reference voltage VS via a fourth resistor 23, said inverting input terminal (−) being coupled to an output terminal of said differential amplifying means 14 via a fifth resistor 24.

14. A signal processing circuit according to claim 13, wherein said output terminal of said differential amplifier means 14 is an output terminal for said signal processing circuit.

15. A signal processing circuit according to claim 3, wherein said correction voltage generating means comprises:

a rectifier means 15, 17 having an input terminal connected to said output terminal of said comparator/amplifier means 10;

a voltage holding mean 18, 19, 20 connected to an output terminal of said rectifier means 15, 17 for integrating outputs from said rectifier means and holding a voltage; and a differential amplifying means 13, 21, 22 having a non-inverted input terminal (+) coupled to an output of said voltage holding means and having an inverting input terminal (−) coupled to said reference voltage VS through a sixth resistor 21, said differential amplifying means having an output terminal coupled to said second current feedback means 12 and having said output terminal coupled to its inverting input terminal (−) via a feedback resistor 22.

16. A signal processing circuit according to claim 15, wherein said rectifier means 15, 17 comprises:
a differential amplifier 15 having a non-inverting input terminal (+) coupled to said output terminal of said comparator/amplifier means 10;
a rectifier 17 having an input terminal coupled to an output terminal of said differential amplifier 15, and having an output terminal coupled to an inverting input terminal (−) of said differential amplifier 15, said differential amplifier 15 and said rectifier 17 being constituted as an ideal diode.

17. A signal processing circuit according to claim 16 further comprising:
a differential amplifying means 14 having a non-inverting input terminal (+) coupled to said output terminal of said comparator/amplifier means 10 and having an inverting input terminal (−) coupled to said reference voltage VS via a fourth resistor 23, said inverting input terminal (−) being coupled to an output terminal of said differential amplifying means 14 via a fifth resistor 24.

18. A signal processing circuit according to claim 17, wherein said output terminal of said differential amplifier means 14 is an output terminal for said signal processing circuit.

19. A signal processing circuit according to claim 16, wherein said sensing element 2 comprises a phototransistor 2 which is a light receiving element for receiving a reflected light in correspondence with a reflectivity of a surface of an optical recording medium radiated by an LED 1 acting as a light emitting element.

20. A signal processing circuit according to claim 19, wherein said optical recording medium is provided with bar codes in which reflective code and non-reflective code are alternately arranged.

21. A signal processing circuit according to claim 20, wherein said reference voltage VS outputted by said reference voltage generating means 16 is set lower than said power supply voltage +B.

22. A signal processing circuit according to claim 21, wherein said power supply has a negative pole connected to a common ground line and a positive pole +B connected to said sensing element 2, said compartor/amplifier means 10 and said correction voltage generating means.

23. A signal processing circuit according to claim 22, wherein said first current feedback means comprises a first fixed resistor 11 and said second current feedback means comprises a second fixed resistor 12 set at a lower resistance value than a value of said first fixed resistor 11.

24. A signal processing circuit according to claim 23, wherein said current I3 flowing in response to a variation of impedance of said sensing element 2 is substantially equivalent to a sum of said first feedback current I1 flowing through said first current feedback means 11 and said second feedback current I2 flowing through said second current feedback means 12.

25. A signal processing circuit according to claim 24, wherein said voltage holding means comprises:
a capacitor 19 to which said reference voltage VS is applied to one end thereof;
a charging resistor 18 having a first terminal connected to an other end of said capacitor 19 and having a second terminal connected to said output terminal of said rectifier means 17, said charging resistor 18 for setting a charging time constant of said capacitor 19; and
a third resistor 20 connected in parallel with said capacitor 19, a common junction between said charging resistor 18 and said third resistor 20 providing said correction voltage for application to said second current feedback means 12.

* * * * *